United States Patent
Chadaga et al.

(10) Patent No.: US 10,924,938 B2
(45) Date of Patent: *Feb. 16, 2021

(54) METHOD AND SYSTEM FOR QUALIFICATION AND PLACEMENT OF NEXT GENERATION EQUIPMENT BASED ON MODELING

(71) Applicant: Verizon Patent and Licensing Inc., Arlington, VA (US)

(72) Inventors: Deepak Chadaga, Coppell, TX (US); Nimalan Kanagasabai, Grapevine, TX (US); Rohit Saraf, Nashua, NH (US); Robert Malupin, Bedford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/427,632

(22) Filed: May 31, 2019

(65) Prior Publication Data

US 2019/0289472 A1    Sep. 19, 2019

Related U.S. Application Data

(63) Continuation of application No. 15/393,678, filed on Dec. 29, 2016, now Pat. No. 10,356,630.

(51) Int. Cl.
| | | |
|---|---|---|
| *H04W 16/20* | (2009.01) | |
| *H04W 52/24* | (2009.01) | |
| *H04W 24/10* | (2009.01) | |
| *H04W 16/22* | (2009.01) | |
| *H04L 5/00* | (2006.01) | |
| *H04B 17/318* | (2015.01) | |

(52) U.S. Cl.
CPC .......... *H04W 16/20* (2013.01); *H04B 17/318* (2015.01); *H04L 5/005* (2013.01); *H04W 52/242* (2013.01); *H04W 16/225* (2013.01); *H04W 24/10* (2013.01)

(58) Field of Classification Search
CPC .. H04W 16/20; H04W 52/242; H04B 17/318; H04L 5/005

See application file for complete search history.

(56) References Cited

U.S. PATENT DOCUMENTS

| | | |
|---|---|---|
| 6,834,180 B1 | 12/2004 | Marshall |
| 7,142,868 B1 | 11/2006 | Broyles et al. |
| 9,883,049 B1 | 1/2018 | Warner |
| 9,930,558 B2 | 3/2018 | Sahin et al. |
| 2004/0198234 A1 | 10/2004 | Wacker et al. |

(Continued)

*Primary Examiner* — Muthuswamy G Manoharan

(57) ABSTRACT

A method, a device, and a non-transitory storage medium provide to receive from an end device, a first measurement of a signal transmitted by a wireless station and measured by the end device outside of a building; receive, from the end device, a second measurement of a signal transmitted by the wireless station and measured by the end device inside the building; calculate, based on the first measurement and the second measurement, a path loss, for a second frequency, between a future generation cell site and the building; calculate a received signal power of the future generation cell site based on the path loss; compare the received signal power to a threshold value; determine, based on the comparison, whether the building is qualified to receive future generation equipment to be placed in the building.

20 Claims, 20 Drawing Sheets

(56) References Cited

U.S. PATENT DOCUMENTS

| | | | |
|---|---|---|---|
| 2012/0238279 A1* | 9/2012 | Yu | H04W 52/244 |
| | | | 455/449 |
| 2013/0150054 A1 | 6/2013 | Axmon et al. | |
| 2014/0254499 A1 | 9/2014 | Hassan et al. | |
| 2015/0173091 A1* | 6/2015 | Ratasuk | H04W 72/0453 |
| | | | 455/452.2 |
| 2016/0353309 A1* | 12/2016 | Gunnarsson | H04W 16/18 |
| 2017/0064088 A1 | 3/2017 | Malee et al. | |

* cited by examiner

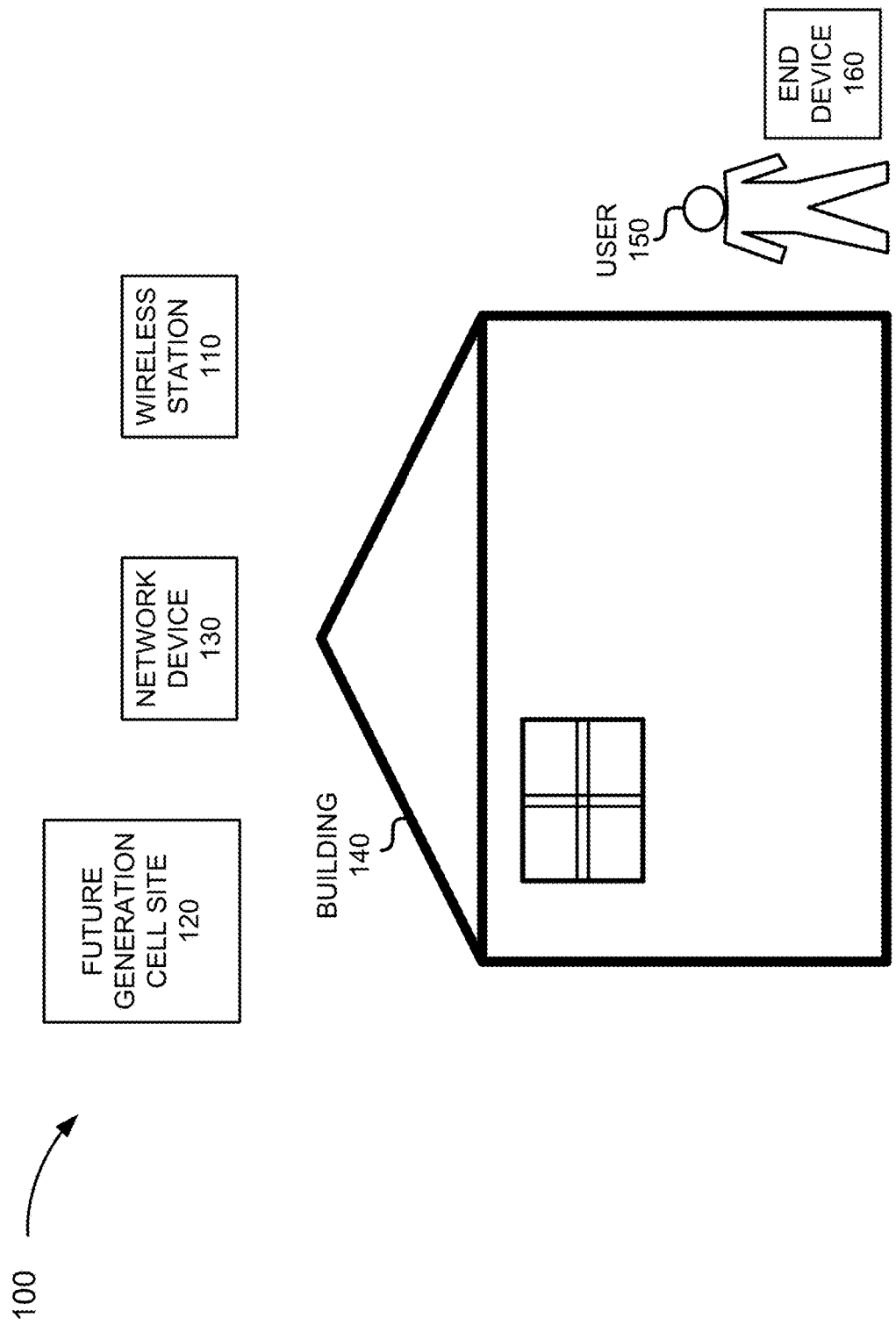

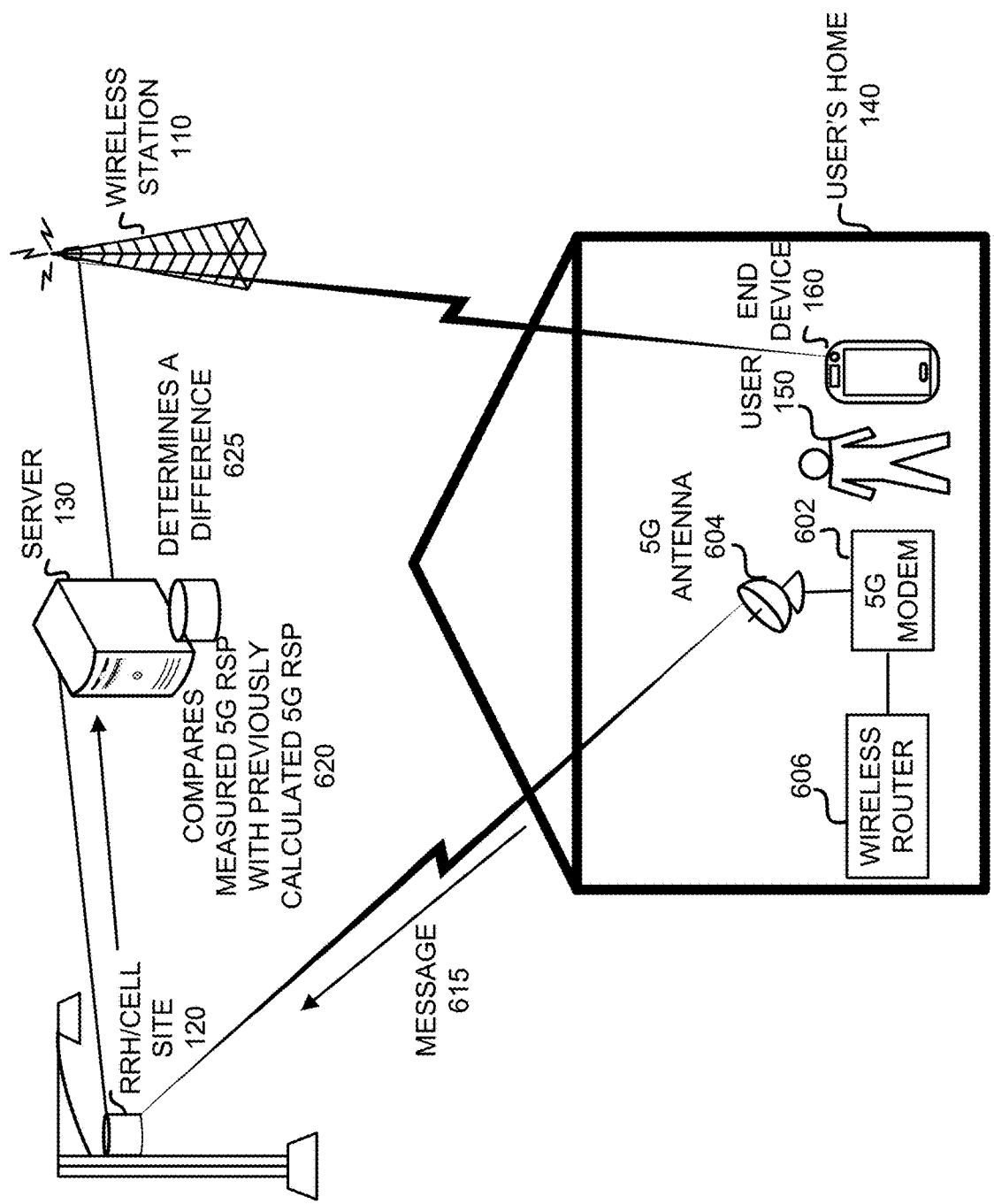

METHOD AND SYSTEM FOR QUALIFICATION AND PLACEMENT OF NEXT GENERATION EQUIPMENT BASED ON MODELING

CROSS REFERENCE TO RELATED APPLICATION

This patent application claims priority to and is a continuation of U.S. patent application Ser. No. 15/393,678, filed on Dec. 29, 2016, the disclosure of which is incorporated by reference herein in its entirety.

BACKGROUND

Given the line-of-sight characteristics of a future generation wireless network, such as a Fifth Generation (5G) network, determining the service availability to users may be problematic.

BRIEF DESCRIPTION OF THE DRAWINGS

FIG. 1 is a diagram illustrating an exemplary environment in which an exemplary embodiment of a qualification service may be implemented;

FIGS. 6A-6E are diagrams illustrating an exemplary process of the self-installation service.

DETAILED DESCRIPTION OF PREFERRED EMBODIMENTS

Figure 2A:
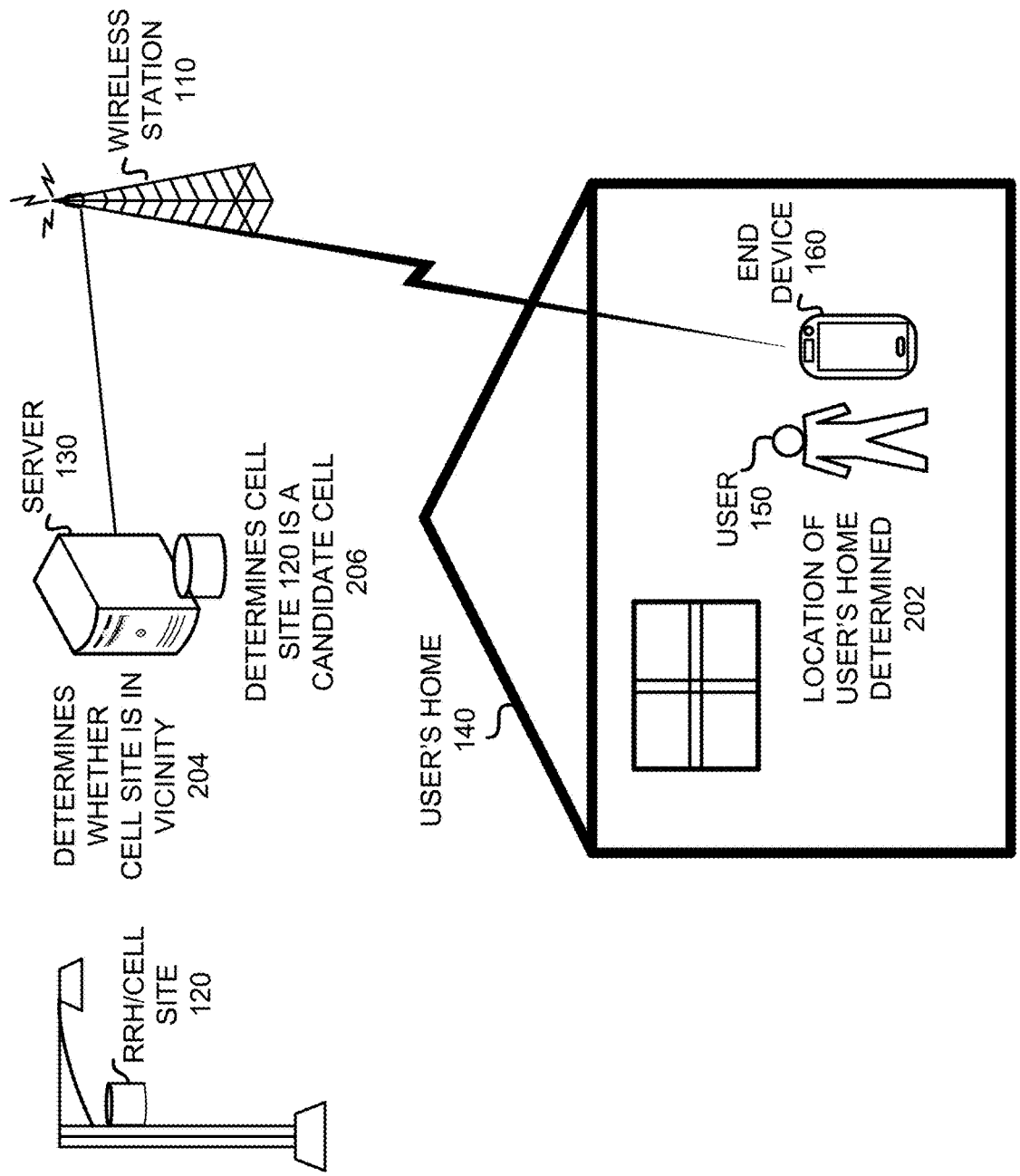
FIGS. 2A-2G are diagrams illustrating an exemplary process of the qualification service.

The following detailed description refers to the accompanying drawings. The same reference numbers in different drawings may identify the same or similar elements. Also, the following detailed description does not limit the invention.

Wireless access network may operate within a frequency spectrum, such as between about 1 Gigahertz (GHz) to about 100 GHz. Wireless devices of the wireless access network may be geographically arranged to allow for line of sight between two or more wireless stations. While the future generation wireless network is being designed to improve upon various parameters such as traffic capacity, latency, data throughput, etc., relative to existing wireless network technology, users may not necessarily receive the full extent of these prospective benefits due to various factors. For example, certain building materials may reduce expected network metrics when users are indoors, as well as the placement and distance of users' receiving equipment from a future generation cell site. As a consequence, the ability to provide users access to the future generation wireless network may be problematic.

According to an exemplary embodiment, a qualification service is described that estimates the conditions of future generation wireless access at a given location. For example, a future or a next generation wireless access may be a 5G technology. As used herein, the term 5G is referring to an advanced or next generation wireless network and is not intended to limit the disclosed embodiments to any specific standard or evolution of advanced wireless networks. According to various exemplary implementations, the location may be a user's residence (e.g., a single-family home, an apartment, a condo, a townhouse, etc.), a place of business (e.g., a store, a restaurant, etc.), or other type of building. In this way, a user may qualify for 5G access before obtaining and setting up 5G equipment in an indoor environment.

According to an exemplary embodiment, the qualification service includes calculating a 5G path loss. According to an exemplary implementation, the 5G path loss is calculated and modeled based on a measurement from an existing network obtained from the user. For example, the user may connect to a 4G wireless access network via an end device, and measure received power, via the end device. According to an exemplary embodiment, the user may be directed to make the measurements along a path from a future generation cell site to a user's indoor location. The qualification service may calculate and model a 5G loss value based on the 4G measurements. According to an exemplary implementation, the 4G measurements may be biased to produce the 5G loss value. The 5G loss value may be used to calculate the 5G path loss.

According to an exemplary embodiment, the qualification service includes calculating a 5G received signal power based on the 5G path loss. According to an exemplary embodiment, the 5G received signal power may be compared to a threshold value to determine whether the user qualifies to obtain 5G equipment for 5G access. When the 5G received signal power satisfies the threshold value, the qualification service may determine that the location is an acceptable 5G coverage zone. However, when the 5G received signal power does not satisfy the threshold value, the qualification may determine that the location is not an acceptable 5G coverage zone.

According to an exemplary embodiment, a service is described that guides the user to set up the 5G equipment. According to an exemplary embodiment, the service uses values measured by the 5G equipment as a basis to adjust estimated 5G values. According to an exemplary implementation, the service uses a machine learning algorithm that may modify estimated 5G values based on measurements obtained from various locations and users.

FIG. 1 is a diagram illustrating an exemplary environment 100 in which an exemplary embodiment of a qualification may be implemented. As illustrated, environment 100 includes a wireless station 110, a future generation cell site 120, a network device 130, a building 140, a user 150, and an end device 160. The number and arrangement of devices in environment 100 are exemplary. According to other embodiments, environment 100 may include additional devices and/or differently arranged devices, than those illustrated in FIG. 1.

A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, and/or a cloud device). For example, network device 130 may be implemented according to various computing architectures and/or one or multiple network architectures.

Wireless station 110 includes a network device of a wireless access network that has computational and wireless communicative capabilities. For example, wireless station 110 may be implemented as an evolved Node B (eNB) of an Evolved UMTS Terrestrial Radio Access Network (E-UTRAN), which may be included in a Long Term Evolution (LTE) network or an LTE-Advanced (LTE-A) network.

Future generation cell site 120 may be a network device of a wireless access network that has wireless capabilities or wireless capabilities and computational capabilities to be installed or is installed. For example, future generation cell site 120 may be implemented as a radio remote unit (RRU). According to another example, future generation cell site 120 may be implemented as an integrated Radio Unit (RU) and a baseband unit (BBU). According to an exemplary implementation, the network device operates according to a future generation wireless technology. For example, the network device may be implemented as a wireless device of a 5G wireless access network or a 5G wireless fronthaul network. The network device may wirelessly communicate within a frequency band between about 1 GHz to about 100 GHz. For example, the network device may transmit and receive in about the 28 GHz spectrum, the 39 GHz spectrum, or some other GHz spectrum below about 100 GHz.

Network device 130 includes a network device that has communication and computational capabilities. For example, network device 130 may be implemented as a computer or a computer and a mass storage device. By way of further example, network device 130 may include a Web server or an Internet Protocol (IP) server. Network device 130 may reside in a network (not illustrated), such as, for example, a private network, a public network (e.g., the Internet, the World Wide Web, etc.), a wide area network (WAN), a metropolitan area network (MAN), a service provider network, an IP Multimedia Subsystem (IMS) network, a Rich Communication Service (RCS) network, a cloud network, or other type of network that may be external to the wireless access network and/or a core network to which wireless station 110 belongs or is communicatively coupled. According to an exemplary implementation, network device 130 may be accessed via wireless station 110.

According to an exemplary embodiment, network device 130 includes logic that provides a qualification service and a self-installation service, as described herein. According to an exemplary implementation, network device 130 stores or has access to storage (e.g., the mass storage device) that stores information pertaining to the qualification service and the self-installation service. For example, network device 130 may store or have access to a database, as described herein. The information may include data pertaining to locations of future generation cell sites, characteristic information pertaining to future generation cell sites, information obtained from users (e.g., user 150), information obtained from a third party service, threshold values, values pertaining to path loss, and loss values to calculate path losses. According to an exemplary implementation, network device 130 uses third party services to obtain an instance of the data.

According to an exemplary embodiment, network device 130 calculates a path loss for 5G service based on the information. According to an exemplary implementation, path loss values for 5G service is based on a biasing of 4G wireless measurements obtained from users and end devices (e.g., user 150 and end device 160). According to an exemplary embodiment, network device 130 calculates estimated 5G received signal strength values based on the path loss values. According to an exemplary embodiment, network device 130 includes a machine learning algorithm. The machine learning algorithm may analyze and modify various values stored in the information, as described herein.

Building 140 may be any type of structure. For example, building 140 may a dwelling, such as a single family house, a multi-family house, a townhouse, an apartment, a condo, or other type of residence. Alternatively, building 140 may be a commercial building, a public building, an industrial building, or other type of infrastructure (e.g., a medical building, an educational building, a governmental building, a military building, a parking structure, etc.).

User 150 is a person that operates end device 160. End device 160 includes a device that has computational and wireless communication capabilities. End device 160 may be implemented as a mobile device or a portable device. For example, the end device 160 may be implemented as a smartphone, a personal digital assistant, a tablet, a laptop, a netbook, a phablet, a wearable device, or some other type of wireless computational device. According to an exemplary embodiment, end device 160 is configured to wirelessly communicate with wireless station 110 and network device 130. According to an exemplary implementation, end device 160 may be a wireless device that has 4G, LTE, or LTE-A wireless capabilities. End device 160 may include a location service (e.g., Global Positioning Service (GPS)). End device 160 may also include other components (e.g., a gyroscope, a compass, a rear facing camera, etc.) that may be used to support the qualification service and the self-installation service, as described herein.

According to an exemplary embodiment, end device 160 includes logic that provides a qualification service and a self-installation service, as described herein. According to an exemplary implementation, end device 160 includes qualification software that provides, when executed, the qualification service. According to an exemplary implementation, end device 160 includes self-installation software that provides, when executed, the self-installation service.

FIGS. 2A-2G are diagrams illustrating an exemplary process of the qualification service. According to various embodiments, an operation or a step described in the process may be performed by server 130, end device 160, or a combination of end device 160 and server 130. Also, a communicative connection between network devices (e.g., wireless station 110 and network device 130) and between end device 160 and network devices (e.g., wireless station 110, server 130) may be indirect. For example, an indirect communication connection may involve an intermediary device and/or an intermediary network not illustrated in FIGS. 2A-2G.

Referring to FIG. 2A, assume end device 160 includes a qualification application. For example, user 150 may download the qualification application from server 130 or from another source (not illustrated). The qualification application provides a qualification service. For example, the qualification application includes user interfaces that guide user 150 through a qualification process that facilitates determining whether user 150 is qualified to receive a self-installation kit. The self-installation kit includes equipment which enables user 150 to receive 5G service from a future generation cell site (e.g., future generation cell site 120) via the 5G equipment.

User 150 starts the qualification application on end device 160. For example, user 150 may be interested in learning whether he/she can order the self-installation kit from a service provider that would enable user 150 to install and obtain 5G service in user's home 140. According to this exemplary scenario, assume that end device 160 connects to server 130 via wireless station 110.

Subsequent to starting the qualification application, a location of user's home 140 may be determined 202. For example, end device 160 may include a Global Positioning System receiver or other location-aware service. Alternatively, the location of user's home 140 may be obtained based on cellular positioning (e.g., triangulation, Enhanced Observed Time Difference (E-OTD), Uplink Time Difference of Arrival (U-TDOA)), indoor positioning (e.g., Wireless Local Area Network (WLAN) positioning, Bluetooth positioning, IEEE 802.11 positioning), or other well-known method. Still further, end device 160 may include a user interface that allows user 150 to enter his/her home address. The home address may be used to obtain geographical coordinates (e.g., latitude and longitude, etc.) of user's home 140.

Based on the location of user's home 140, it is determined whether a future generation cell site is in the vicinity 204 of user's home 140. For example, server 130 may correlate the location of user's home 140 with known locations of future generation cell sites. For example, server 130 may store or access future generation cell site information that indicates locations of future generation cell sites. Server 130 may search the future generation cell site location information based on the location of user's home 140. For example, server 130 may store or have access to one or multiple local and/or remote databases that operate based on a database management system (DBMS). The DBMS may be implemented using relational or No Structured Query Language (NoSQL) software/packages (e.g., Microsoft SQL, Oracle Database, Cassandra, MongoDB, etc.). The database may store qualification information in various types of data structures, an example of which is described below.

Figure 3A:
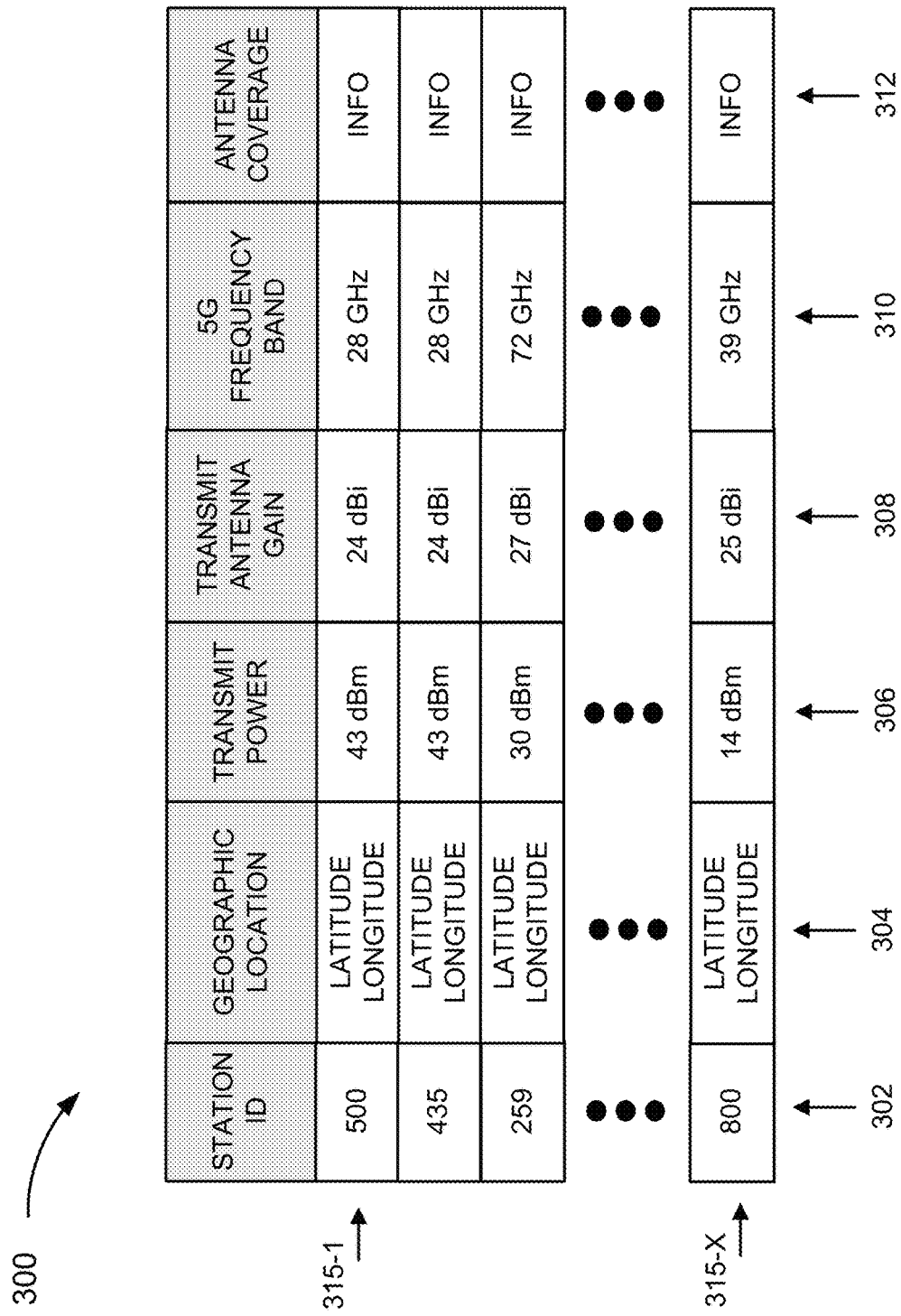
FIG. 3A is a diagram illustrating an exemplary table that stores exemplary qualification information.

FIG. 3A is a diagram that illustrates exemplary types of qualification information that may be stored in a table 300. As illustrated, table 300 includes a station identifier field 302, a geographic location field 304, a transmit power field 306, a transmit antenna gain field 308, a 5G frequency band field 310, and an antenna coverage field 312. As further illustrated, table 300 includes profiles 315-1 through 315-X (also referred to as profiles 315 and, individually and generically as profile 315). Each profile 315 includes a grouping of data fields 302 through 310. Each profile 315 includes at least one instance of qualification information that is different from another profile 315. The values illustrated in FIG. 3A are purely exemplary.

Station identifier field 302 may store an identifier that identifies a future generation cell site (e.g., future generation cell site 120). For example, station identifier field 302 may store an E-UTRAN Cell Global Identifier (ECGI), a Physical Cell Identifier (PCI), or a globally unique identifier (GUID), such as a Global evolved Node B (eNB) Identifier (Global eNB ID).

Geographic location field 304 may store geographic coordinates of the future generation cell site. According to an exemplary implementation, the geographic coordinates may include latitude and longitude. According to other exemplary implementations, the geographic coordinates may include data indicating a state, a county, a city, a street address, a zip code, and/or other type of location information.

Transmit power field 306 may store data indicating a transmit power value of the future generation cell site.

Transmit antenna gain field 308 may store data indicating the transmit antenna gain value of the future generation cell site.

5G frequency band field 310 may store data indicating a frequency band at which the future generation cell site uses to transmit data and receive data. By way of example, 5G frequency band field 310 may store data indicating one or multiple frequency bands within a range of about 1 GHz through about 100 GHz.

Antenna coverage field 312 may store data indicating other attributes or configurations associated with the future generation cell site. For example, antenna coverage field 312 may store data indicating a height or an elevation of an antenna of the future generation cell site, a tilt of the antenna, a coverage area of the antenna (e.g., 360 degrees, 270 degrees, 180 degrees, 120 degrees, 90 degrees, etc.), and/or an Equivalent Isotropically Radiated Power (EIRP) value.

According to other implementations, table 300 may store additional instances, fewer instances, and/or different instances of qualification information. By way of example, table 300 may store additional information pertaining to a configuration or an attribute of future generation cell sites. For example, according to other exemplary implementations, table 300 may store data indicating a general description of location (e.g., rural, inner city, etc.), other equipment specifications of the future generation cell site, or other parameters (e.g., fade margin, true azimuth, etc.).

Referring to FIGS. 2A and 3A, according to an exemplary implementation, server 130 may search table 300 and compare the geographic location of user's home 140 to the geographic locations stored in geographic location field 304. In response to a result of the search and comparisons, server 130 may select a future generation cell site that is closest to user's home 140. According to an exemplary implementation, server 130 may calculate a distance between the geographic location of user's home 140 and the geographic location of the nearest future generation cell site. Server 130 may determine whether the distance satisfies a distance threshold value. For example, the distance threshold value may indicate a maximum distance. By way of further example, the maximum distance may be between about 200 meters and about 600 meters, or some other configurable distance. According to this exemplary scenario, server 130 determines that cell site 120 is a candidate cell 206 for user 150 to receive 5G service.

Figure 2B:
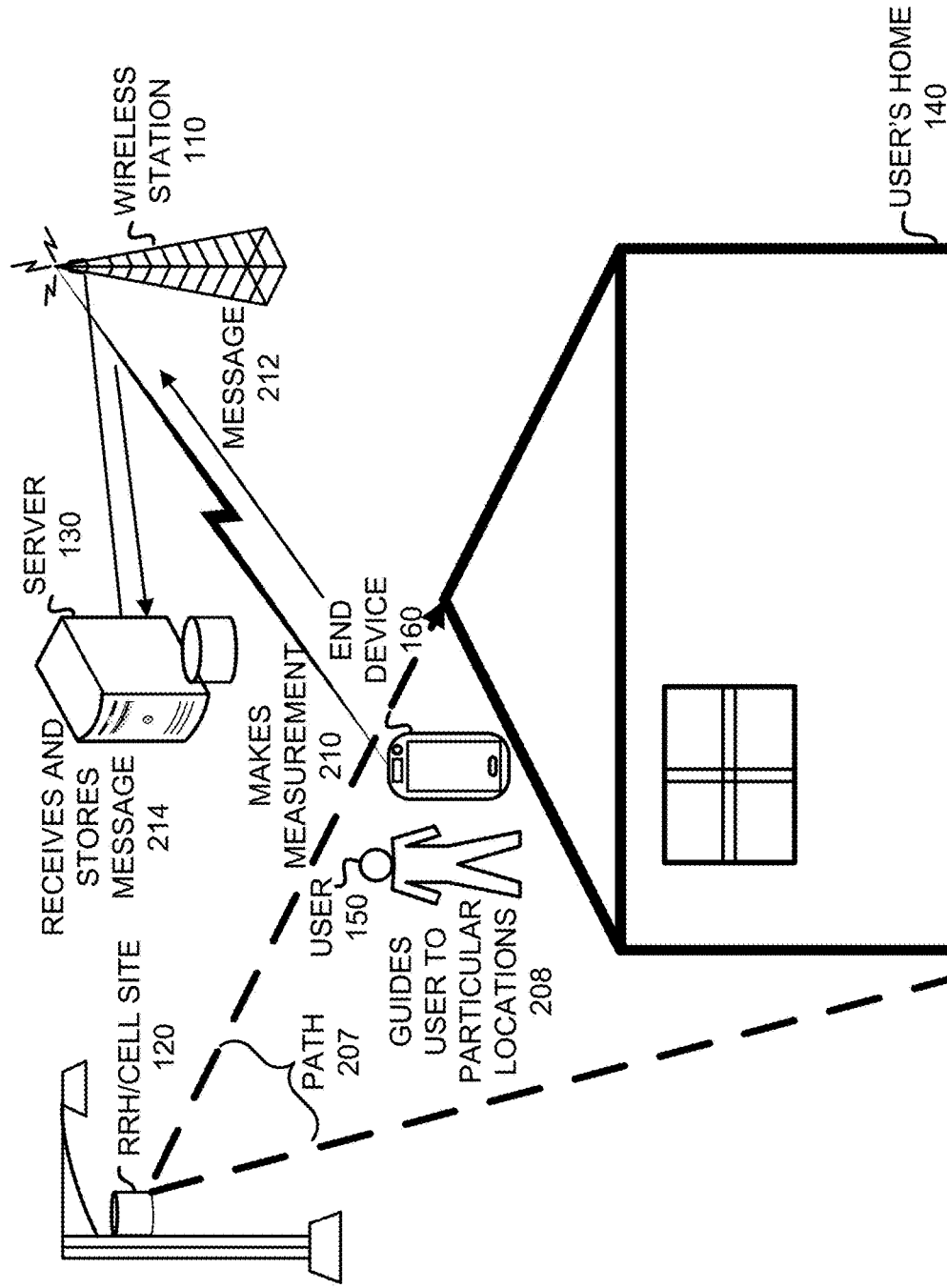

Referring to FIG. 2B, in response to determining that a candidate cell for 5G service is present, the qualification application may provide user interfaces that guide user 150 to make, via end device 160, 4G measurements outside user's home 140. For example, the 4G measurements may include a radio frequency (RF) condition, such as a Reference Signal Receive Power (RSRP), a Received Signal Strength Indicator (RSSI), and/or a Reference Signal Received Quality (RSRQ). The 4G measurements may include other parameters, such as signal-to-noise ratio (SNR), signal-to-interference-plus-noise ratio (SINR), or other channel condition value. The qualification application may guide user 150 to particular locations 208 outside user's home 140 so as to make such measurements. For example, user 150 may be guided to one or multiple points within/along a path and/or a direction 207 between cell site 120 and user's home 140. Server 130 may determine the path and/or the direction based on the qualification information stored in table 300 and the location of user's home 140. By way of further example, user 150 may be guided to fixed outdoor location points using the qualification application and other functions provided at end device 160 (e.g., GPS, compass, camera). The qualification application and other functions (e.g., compass, camera, etc.) may guide user 150 to a GPS location that corresponds to a line of direction between cell site 120 and user's home 140. The line of direction may or may not provide a line of sight between cell site 120 and user's home 140. The qualification application may have user 150 point end device 160 towards cell site 120 so that a visual representation of cell site 120 (e.g., transmitter) can be established. A 4G radio frequency signal may then be measured at the relevant GPS location, and the measurement may subsequently be transmitted to server 130.

User 150 may perform similar actions in two or more locations around user's home 140 as determined by server 130. For example, the qualification application may guide user 150 to two or more outdoor locations starting with the closest and working towards the furthest based on a linear distance between user 150/end device 160 and cell site 120. Once the outdoor location fix is complete, the qualification application may guide user 150 to take similar measurements indoors in user's home 140 (e.g., on a first floor, a second floor, etc.). While making the indoor measurements, user 150 may be asked, via the qualification application, whether he/she can see cell site 120 from these indoor locations. End device 160 may provide server 130 with user 150's response to assist in the ascertainment of an indoor location for measurement.

User 150 may make a measurement 210, via end device 160, at each location outside user's home 140. Additionally, or alternatively, user 150 may select a location and/or adjust a location of a recommended location provided by the qualification application. For example, user 150 may select a location that is close to a room in user's home 140 that user 150 plans to place 5G equipment and is within/along path 207 that is unobstructed or minimally obstructed. End device 160 may transmit a message 212 that includes the 4G measurements to server 130. The message may also include other data, such as a timestamp (e.g., day and time), a location (e.g., geographic coordinate), and an identifier (e.g., a user identifier that identifies user 150, an end device identifier that identifies end device 160, a session identifier that identifies the session, etc.). In response, server 130 may receive and store the message 214 in a database.

Figure 3B:
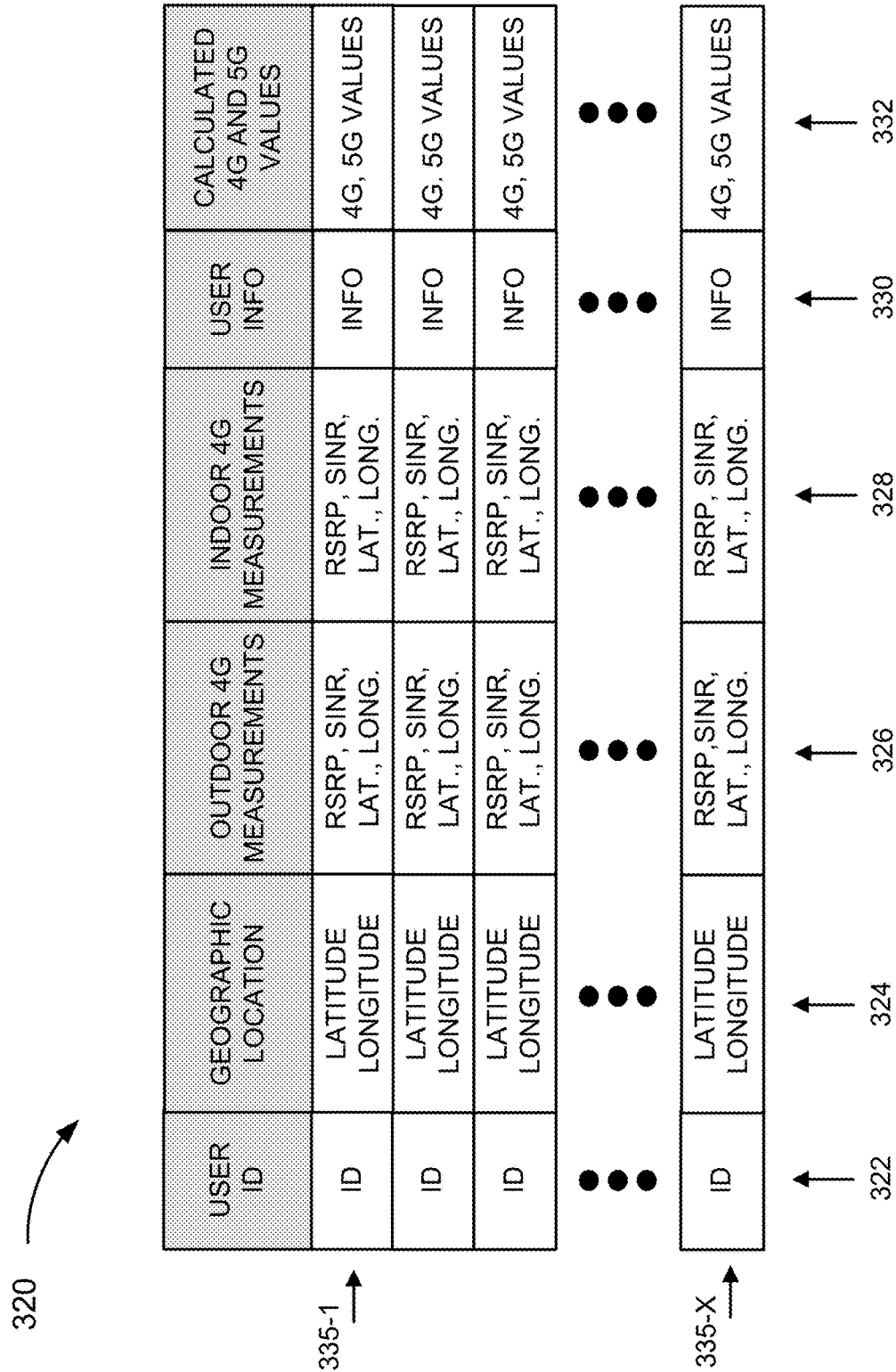
FIG. 3B is a diagram illustrating another exemplary table that stores other exemplary qualification information.

FIG. 3B is a diagram that illustrates exemplary types of qualification information that may be stored in a table 320. As illustrated, table 320 includes a user identifier field 322, a geographic location field 324, an outdoor 4G measurements field 326, an indoor 4G measurements field 328, a user information field 330, and a calculated 4G and 5G values field 332. As further illustrated, table 320 includes profiles 335-1 through 335-X (also referred to as profiles 335 and, individually and generically as profile 335). Each profile 335 includes a grouping of data fields 322 through 332. Each profile 335 includes at least one instance of qualification information that is different from another profile 335.

User identifier field 322 may store data that identifies a user (e.g., user 150). For example, the user identifier field 322 may store the name of the user, a telephone number of the user, an International Mobile Subscriber Identity (IMSI), an International Mobile Station Equipment Identity (IMEI), a Mobile Equipment Identifier (MEID), or some other type of unique identifier indicating the user and/or the end device. Server 130 may obtain the identifier via the qualification application.

Geographic location field 324 may store data indicating the location of the building (e.g., user's home 140) associated with the user. According to an exemplary implementation, the geographic coordinates may include latitude and longitude. According to other exemplary implementations, the geographic coordinates may include data indicating a state, a county, a city, a street address, a zip code, and/or other type of location information.

Outdoor 4G measurement field 326 may store data indicating an RF condition and/or a channel value that is measured or calculated based on the user's outdoor measurements. For example, outdoor 4G measurement field 326 may store an RSRP value, an RSSI value, and/or an RSRQ value. Outdoor 4G measurement field 326 may also store data indicating other parameters, such as SNR, SINR, or other values (e.g., timestamp, a location, etc.).

Indoor 4G measurement field 328 may store data indicating an RF condition and/or a channel value that is measured or calculated based on the user's indoor measurements. For example, indoor 4G measurement field 328 may store an RSRP value, an RSSI value, and/or an RSRQ value. Indoor 4G measurement field 328 may also store data indicating other parameters, such as SNR, SINR, or other values (e.g., timestamp, a location, etc.).

User information field 330 may store data obtained from a user (e.g., user 150) and/or a third party service. For example, user information field 330 may store data pertaining to building 140 (e.g., building material, number of windows, etc.), data pertaining to inside building 140 (e.g., window coverings, floor level, etc.), foliage information, climate information (e.g., rain, etc.), as described herein. User information field 330 may also store data indicating a path loss model (e.g., non-line-of-sight (NLOS), line-of-sight (LOS)).

Calculated 4G and 5G values field 332 may store data indicating calculated values included in the expressions used for providing the qualification service, as described herein. For example, various loss values (e.g., rain loss value, foliage loss value, penetration loss value, interior loss value, etc.), scalar values (e.g., $n_{LTE\_BIAS}$, $\alpha$, $\beta$), path loss values (e.g., $PL_{5G}$), received power values (e.g., a $RXPower_{5G}$), and other values (e.g., $d_{breakpoint}$, $d_{foliage}$) may be stored in calculated 4G and 5G values field 332. Calculated 4G and 5G values field 332 may also store threshold values (e.g., distance threshold value, a 5G received signal power threshold value, etc.) and other values (e.g., values that define the path or geographic area between the future generation cell site and building 140), as described herein.

According to other implementations, table 320 may store additional instances, fewer instances, and/or different instances of qualification information. By way of example, table 320 may store additional information pertaining to the location of building 140 and/or cell site 120. For example, table 320 may store pictures, topology and morphology information of area pertaining to qualification, weather and atmospheric information (e.g., temperature, humidity, snowfall, wind, etc.), or other environmental data.

Figure 2C:
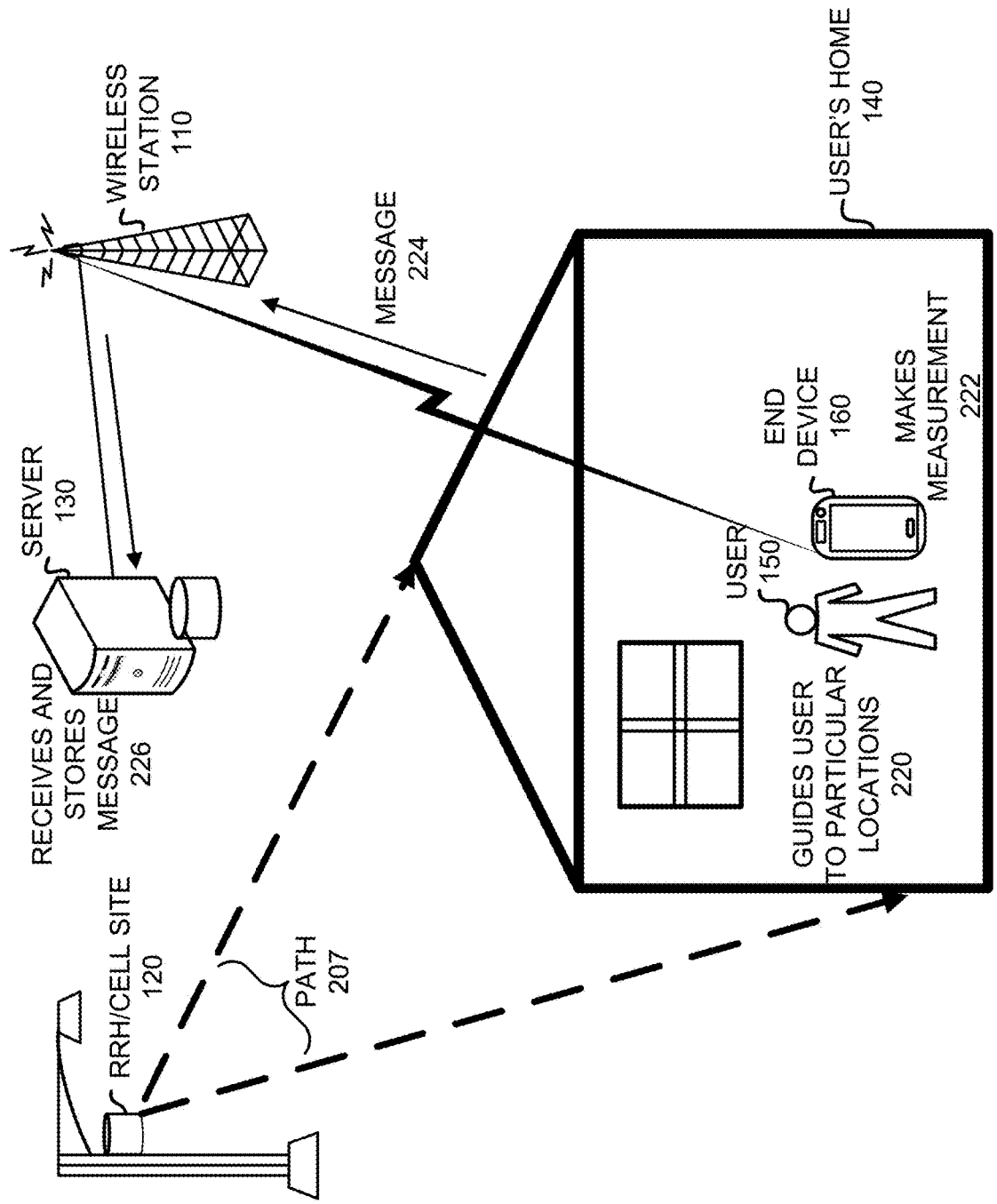

Referring to FIGS. 2B and 3B, server 130 may store data of message 212 in various fields of table 320 (e.g., user identifier field 322, outdoor 4G measurements field 326, etc.). Referring to FIG. 2C, in response to transmitting the message, the qualification application may guide user 150 to particular locations 220 inside user's home 140 so as to make further measurements. For example, user 150 may be guided to one or multiple points along the path and/or the direction previously established between cell site 120 and user's home 140. User 150 may make a measurement 222, via end device 160, at each location inside user's home 140. End device 160 may transmit a message 224 that includes the 4G measurements to server 130. The message may also include other data, such as a timestamp (e.g., day and time), a location (e.g., geographic coordinate), and an identifier (e.g., a user identifier that identifies user 150, an end device identifier that identifies end device 160, a session identifier that identifies the session, etc.). In response, server 130 may receive and store message 226. For example, referring to FIG. 3B, server 130 may store data of message 224 in various fields of table 320 (e.g., indoor 4G measurements field 328, etc.).

Figure 2D:
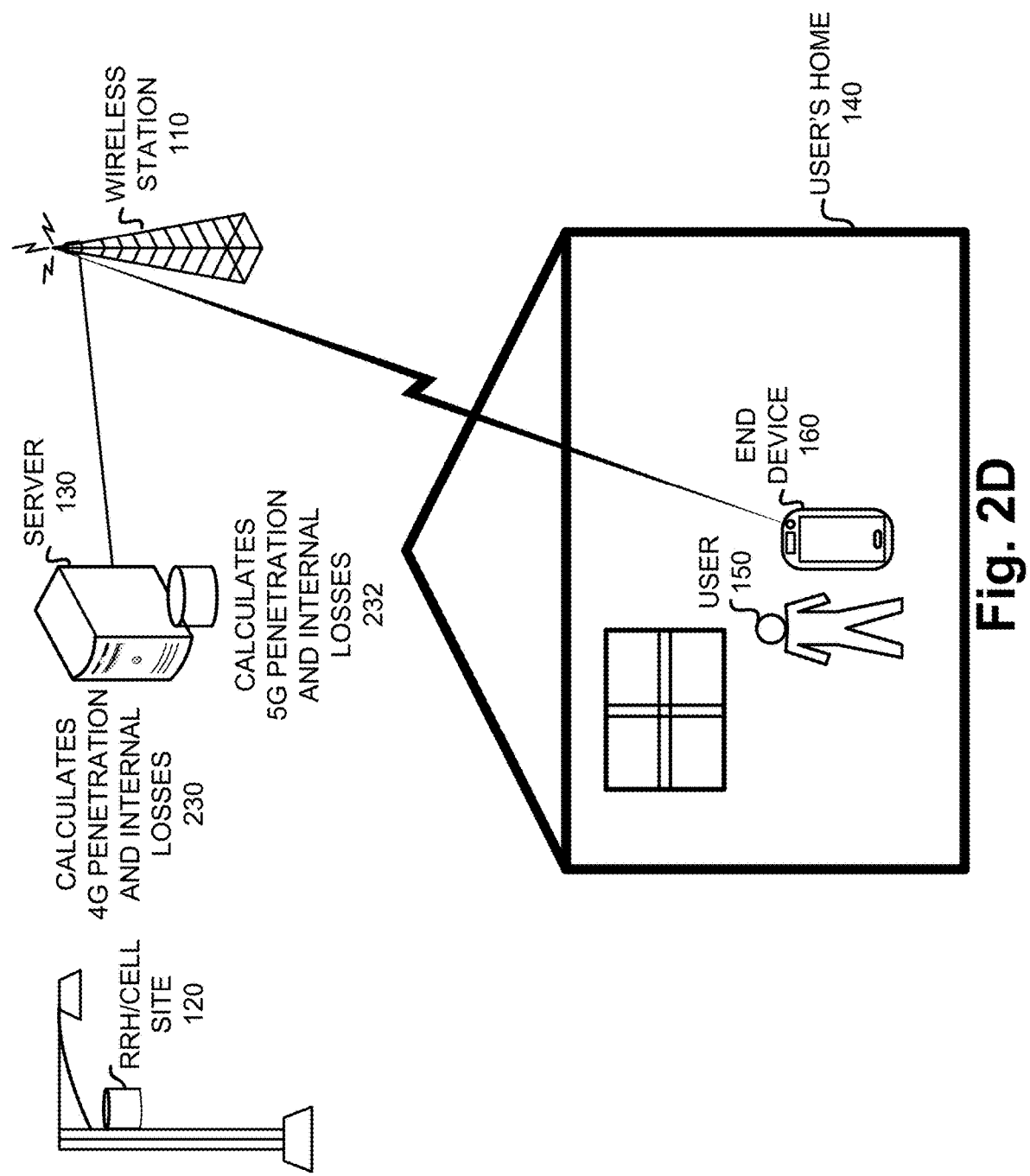

Referring to FIG. 2D, server 130 may calculate 4G losses based on the measurements received. According to an exemplary implementation, server 130 calculates a 4G penetration loss and a 4G internal loss 230. The 4G penetration loss may account for the penetration loss of the radio frequency into user's home 140. According to an exemplary implementation, the qualification application may provide a user interface that prompts user 150 for details pertaining to user's home 140 relative to the established path (e.g., particular side of a home, etc.), such as building material of user's home 140 (e.g., brick, vinyl siding, etc.), number of windows, type of windows, floor level, and/or other feature that may contribute to loss other than air or free-space (e.g., doors, roof material, inner wall material (e.g., sheetrock, brick, etc.), etc.). Although not illustrated, end device 160 may transmit this information to server 130. Server 130 may store this information in table 320 (e.g., user information field 330). According to another exemplary implementation, server 130 may use an average 4G penetration loss value. For example, the average 4G penetration loss value may be based on lab measurements conducted during lab tests, in which different average 4G penetration loss values may be calculated and correlated to various factors (e.g., different 4G frequency bands, different building materials, etc.). Server 130 may select the average 4G penetration loss value based on the values of factors used that best match the information available during the qualification session. For example, although not illustrated, server 130 may store or has access to a database that stores this information.

The 4G internal loss may account for the internal loss of the radio frequency within user's home 140. According an exemplary implementation, the qualification application may provide a user interface that prompts user 150 for details pertaining to the area within user's home 140 (e.g., a room) relative to the established path, such as window coverings (e.g., blinds, curtains, etc.), furniture, wall attachments (e.g., artwork, paintings, tapestries, mirrors, etc.), or other feature that may contribute to loss other than air or free-space. Although not illustrated, end device 160 may transmit this information to server 130. Server 130 may store this information in table 320 (e.g., user information field 330). According to another exemplary implementation, server 130 may use an average 4G internal loss value. For example, the average 4G internal loss value may be based on lab measurements correlated to various factors (e.g., 4G frequency band, location of user's home 140, etc.).

Server 130 may also determine the frequency band (e.g., LTE frequency band) used by wireless station 110 to communicate with end device 160. For example, server 130 may correlate the location of user's home 140 with the nearest 4G cell site (e.g., wireless station 110), request this information from wireless station 110, request this information from end device 160 (e.g., via qualification application), or obtain this information from some other source (e.g., a home subscriber server (HSS), a database, etc.).

Based on the calculated 4G penetration and internal losses, server 130 may calculate a 5G penetration loss and a 5G internal loss 232. According to an exemplary embodiment, server 130 calculates the 5G penetration and internal losses based on biasing the 4G penetration and internal loss values. For example, server 130 may calculate the 5G penetration loss and the 5G internal loss based on the following expressions:

$$\text{Loss}_{5G} \text{ (Penetration)} = \alpha * \text{Loss}_{LTE} \text{ (Penetration)} \qquad (1)$$

$$\text{Loss}_{5G} \text{ (Interior)} = \beta * \text{Loss}_{LTE} \text{ (Interior)}, \qquad (2)$$

in which the values of $\alpha$ and $\beta$ may be frequency dependent and based on lab measurements conducted during lab tests, in which different values for $\alpha$ and $\beta$ may be calculated and correlated to various factors (e.g., 5G frequency band, 4G frequency band, building materials, interior characteristics, etc.). For example, the frequency band at which 5G cell site 120 transmits and receives may be correlated with the frequency band of wireless station 110. Additionally, for example, the details pertaining to the user's home 140 and the details pertaining to the area within the user's home 140 may be correlated with the values of $\alpha$ and $\beta$. In this way, the scalar values of $\alpha$ and $\beta$ may bias the 4G losses to corresponding 5G losses. Although not illustrated, server 130 may store or has access to a database that stores this information. Server 130 may select the values of $\alpha$ and $\beta$ based on the values of factors used that best match the information available during the qualification session.

Figure 2E:
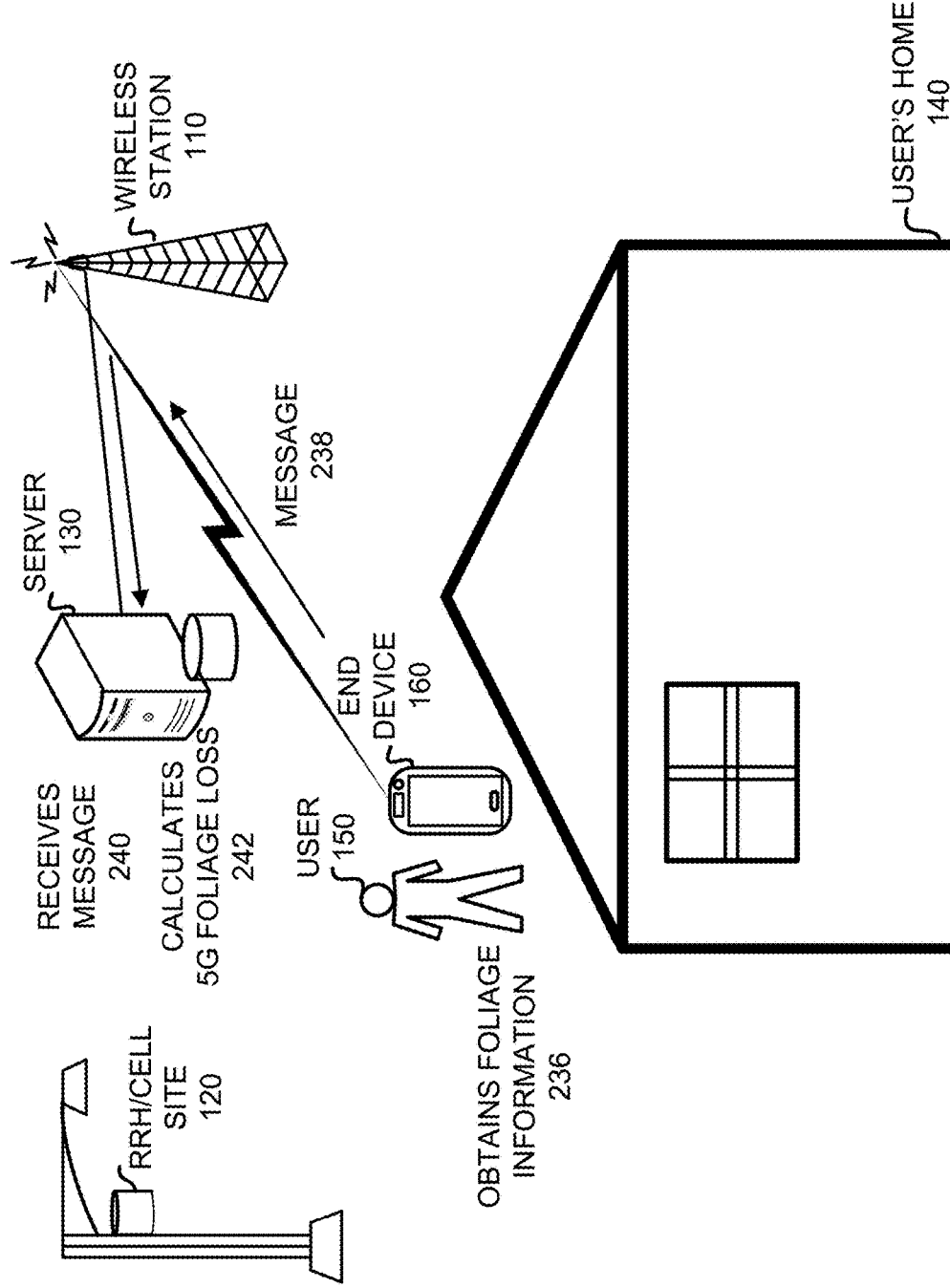

Referring to FIG. 2E, foliage information is obtained 236. According to an exemplary implementation, the qualification application may provide a user interface that prompts user 150 for details pertaining obstacles that may lie in the established path. For example, the user interface may allow user 150 to indicate the number of trees, the height of the trees, or other obstacles that may lie in the established path between user's home 140 and cell site 120. End device 160 may transmit a message 238 that includes the foliage information to server 130. Server 130 may receive message 240 and store the data carried in message 238 in table 320 (e.g., user information field 330). In response to receiving the message, server 130 calculates a 5G foliage loss 242. According to an exemplary implementation, server 130 calculates the 5G foliage loss based on Weissberger's model. For example, server 130 may calculate the 5G foliage loss based on the following exemplary expression:

$$\text{Loss}_{5G} \text{ (Foliage)} = 1.33 f^{0.284} d_{foliage}^{0.588}, \text{ for } 14 < d_{foliage} \le 400 \qquad (3)$$

$$= 0.45 f^{0.284} d_{foliage}, \text{ for } 0 < d_{foliage} \le 14, \qquad (4)$$

where $f$ is in GHz, in which $d_{foliage}$ (e.g., the distance in meters through foliage) may be estimated based on information provided by user 150. For example, as previously described, user 150 may be prompted to provide information, such as the number of trees in a candidate path between the 5G cell site, the height of the trees, etc. The exemplary expression may be used for frequencies f ranging from 230 MHz through 95 GHz.

Figure 2F:
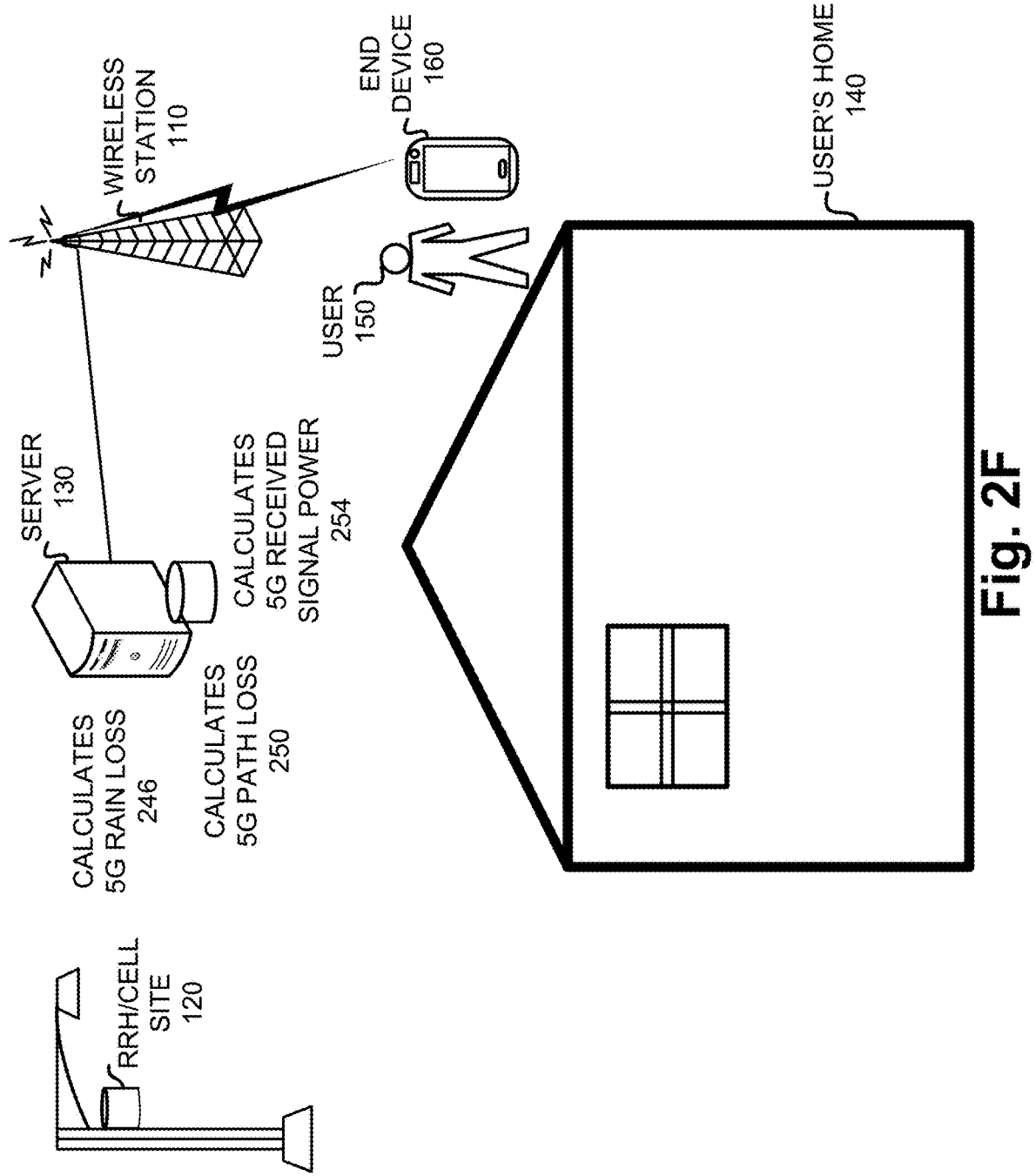

Referring to FIG. 2F, server 130 may calculate a 5G rain loss. The 5G rain loss may be based on the 5G frequency, the geographic locale of user's home 140, and climate information, such as quantified information (e.g., amount of rainfall per year, frequency of rainfall, etc.) and/or averaged information (e.g., arid locale, semi-arid locale, etc.). The 5G rain loss may also be based on lab measurements conducted during lab tests pertaining to the 5G frequency and dB loss associated with varying levels of rain (e.g., sprinkle, moderate, downpour, etc.). Although not illustrated, server 130 may store or has access to a database that stores this information. Server 130 may select the 5G rain loss value based on the values of factors used that best match the information available during the qualification session. According to another example, an average 5G rain loss value may be assigned that can be used for all cases.

Subsequent to the calculation of various 5G loss values, server 130 may calculate a 5G path loss 250. For example, server 130 may calculate the 5G path loss based on the exemplary expression:

$$PL_{5G} \text{ (dB)}=FSPL_{5G} \text{ (about 1 meter)}+20 \log(d_{breakpoint})+10n_{LTE\_BIAS}*\log(d-d_{breakpoint})+ \text{Loss}_{5G} \text{ (Penetration)}+\text{Loss}_{5G} \text{ (Interior)}+\text{Loss}_{5G} \text{ (Rain)}+\text{Loss}_{5G} \text{ (Foliage)}, \quad (5)$$

in which the Free Space Path Loss (FSPL)–$FSPL_{5G}$ (about 1 meter) is the FSPL calculated for a distance of about 1 meter using the Friis equation for path loss. For example, $FSPL_{5G}$ (about 1 meter) (dB)=20 log(f)+32.45, in which f is the frequency of cell site 120 in GHz. The value of about 1 meter is purely exemplary and other values of distance may be used.

20 log($d_{breakpoint}$) is the FSPL up to a distance $d_{breakpoint}$. The value of $d_{breakpoint}$ may be based on lab measurements conducted during lab tests in which different factors (e.g., 5G frequency band, etc.) are used that may derive different values for $d_{breakpoint}$. Although not illustrated, server 130 may store or has access to a database that stores this information. Server 130 may select the value of $d_{breakpoint}$ based on the values of factors used that best match the information available during the qualification session.

d is the distance of building 140 from future generation cell site 120.

$10n_{LTE\_BIAS}*\log(d-d_{breakpoint})$ is the loss taking into account path loss exponent $n_{LTE\_BIAS}$. For example, a constant value of 4 for path loss exponent $n_{LTE\_BIAS}$ may be assumed. However, the value of $n_{LTE\_BIAS}$ may be adjusted based on empirical results. For example, server 130 may include machine learning logic that adjusts the value of $n_{LTE\_BIAS}$ based on subsequent values obtained from users (e.g., during the self-installation process) and used for comparative analysis.

$\text{Loss}_{5G}$ (Penetration), $\text{Loss}_{5G}$ (Interior), $\text{Loss}_{5G}$ (Foliage), and $\text{Loss}_{5G}$ (Rain) have been previously explained.

In response to calculating the 5G path loss, server 130 may calculate a 5G received signal power 254 based on the 5G path loss. For example, server 130 may calculate the 5G received signal power based on the exemplary expression:

$$RX\text{Power}_{5G} \text{ (dBm)}=TX_{5G} \text{ (dBm)}+TX\text{Ant}_{Gain} \text{ (dBi)}-PL_{5G} \text{ (dB)}+RX\text{Ant}_{Gain} \text{ (dBi)}, \quad (6)$$

in which $TX_{5G}$ (dBm) represents the transmit power of cell site 120. This value may be a known value.

$TX\text{Ant}_{Gain}$ represents the transmit antenna gain of cell site 120. This value may also be a known value.

$RX\text{Ant}_{Gain}$ (dBi) represents the receive antenna gain of the 5G equipment that may be installed. This value may also be a known value.

$PL_{5G}$ (dB) is the value calculated from expression (5).

Figure 2G:
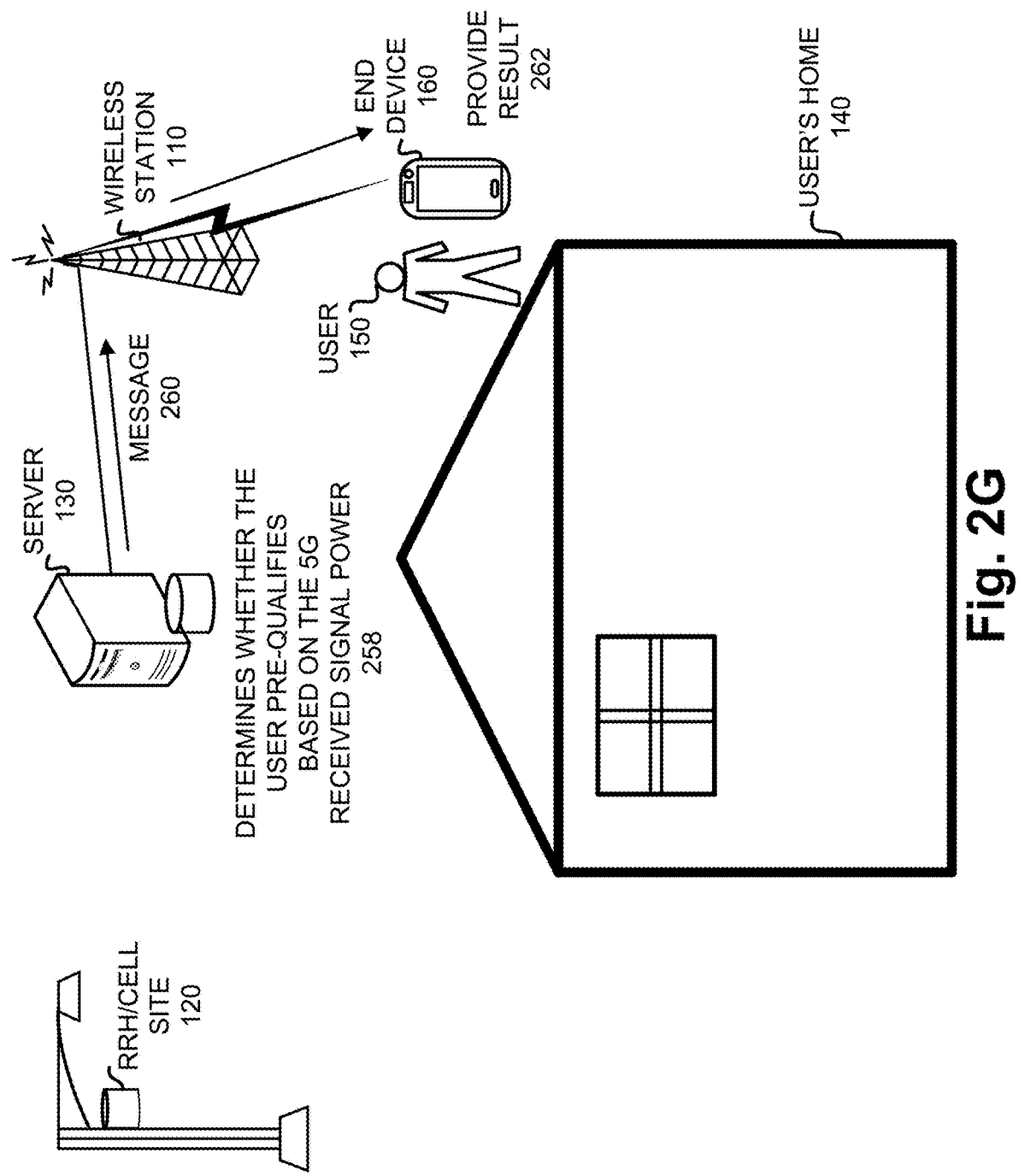

Referring to FIG. 2G, server 130 may determine whether user 150 qualifies to receive the 5G installation kit, which includes the 5G equipment, based on the 5G received signal power 258. According to an exemplary implementation, server 130 stores a 5G received signal power threshold value. Server 130 compares the calculated 5G received signal power value with the 5G received signal power threshold value. Based on the result of the comparison, server 130 may determine whether the threshold value has been satisfied. When the threshold value has been satisfied, server 130 determines that user 150 qualifies for the self-installation kit. When the threshold value has not been satisfied, server 130 determines that user 150 does not qualify for the self-installation kit. In either case, server 130 may transmit a message 260 to end device 160. The message may indicate whether user 150 qualifies or not. In response to receiving the message, end 150 may provide the result 262 to user 150. For example, qualification application may provide a user interface that indicates whether user 150 has qualified or not. According to this exemplary scenario, assume that user 150 qualified. User 150 may subsequently order the self-installation kit.

Although FIGS. 2A-2G illustrate an exemplary process of the qualification service, according to other exemplary embodiments, the process may include additional, fewer, and/or different operations/steps than those described. For example, server 130 may obtain various types of information from a third party, instead of, or in addition to the information obtained from user 150 via end device 160. Also, the order of the steps may be different.

Figure 4:
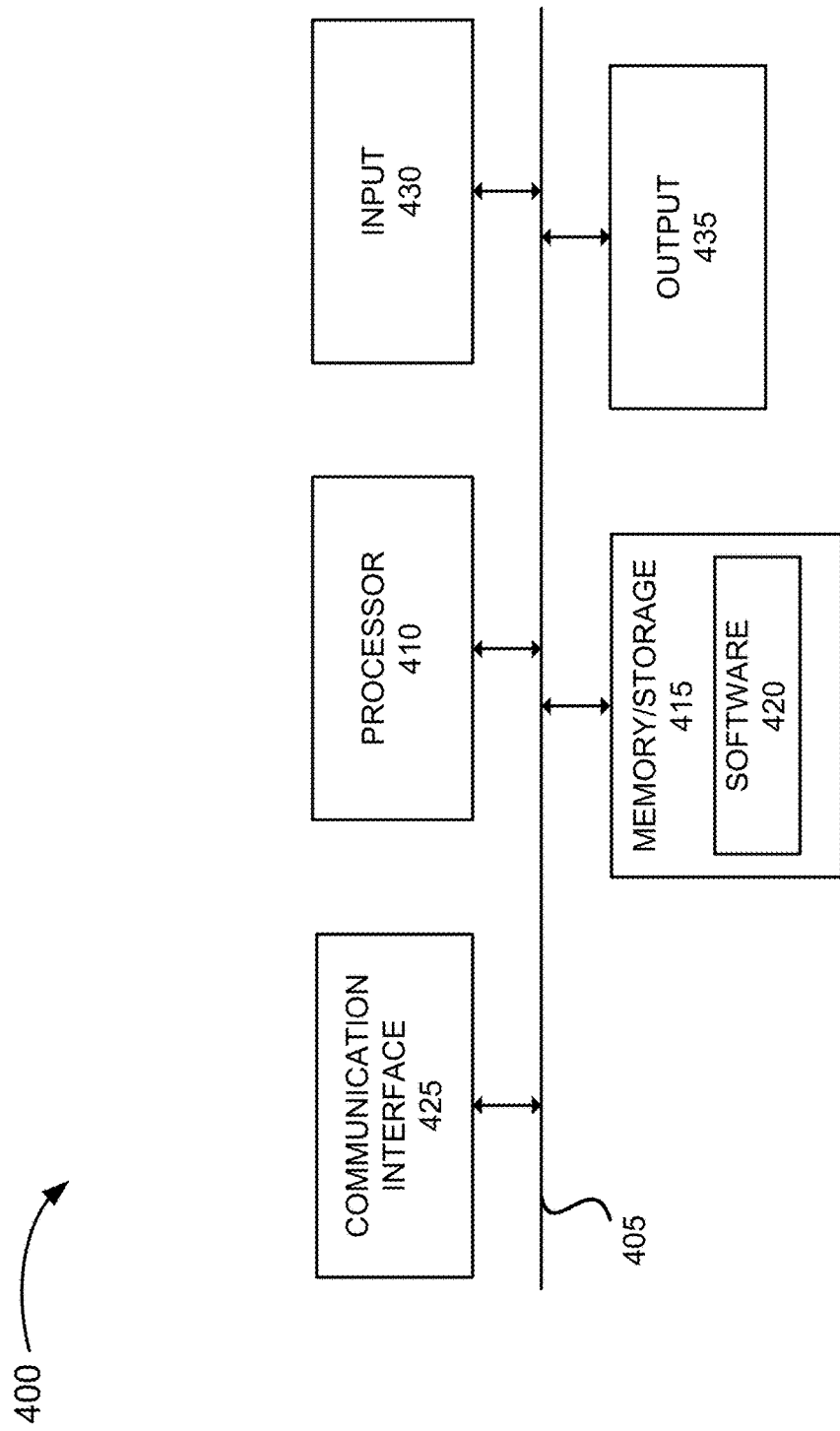
FIG. 4 is a diagram illustrating exemplary components of a device that may correspond to one or more of the devices illustrated herein.

FIG. 4 is a diagram illustrating exemplary components of a device 400 that may correspond to one or more of the devices described herein. For example, device 400 may correspond to components of wireless station 110, cell site 120, network device 130, and/or end device 160. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 415 may include a hard disk (e.g., a magnetic disk, an optical disk, a magneto-optic disk, a solid state disk, etc.) and a corresponding drive. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to server 130, software 420 may include an application that, when executed by processor 410, provides the functions of the qualification, as described herein. Also, end device 160 may include an application that, when executed by processor 410, provides the functions of the qualification service, as described herein. Software 420 may also include firmware, middleware, microcode, hardware description language (HDL), and/or other form of instruction.

Communication interface 425 permits device 400 to communicate with other devices, networks, systems, and/or the like. Communication interface 425 includes one or multiple wireless interfaces. Communication interface 425 may include one or multiple wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
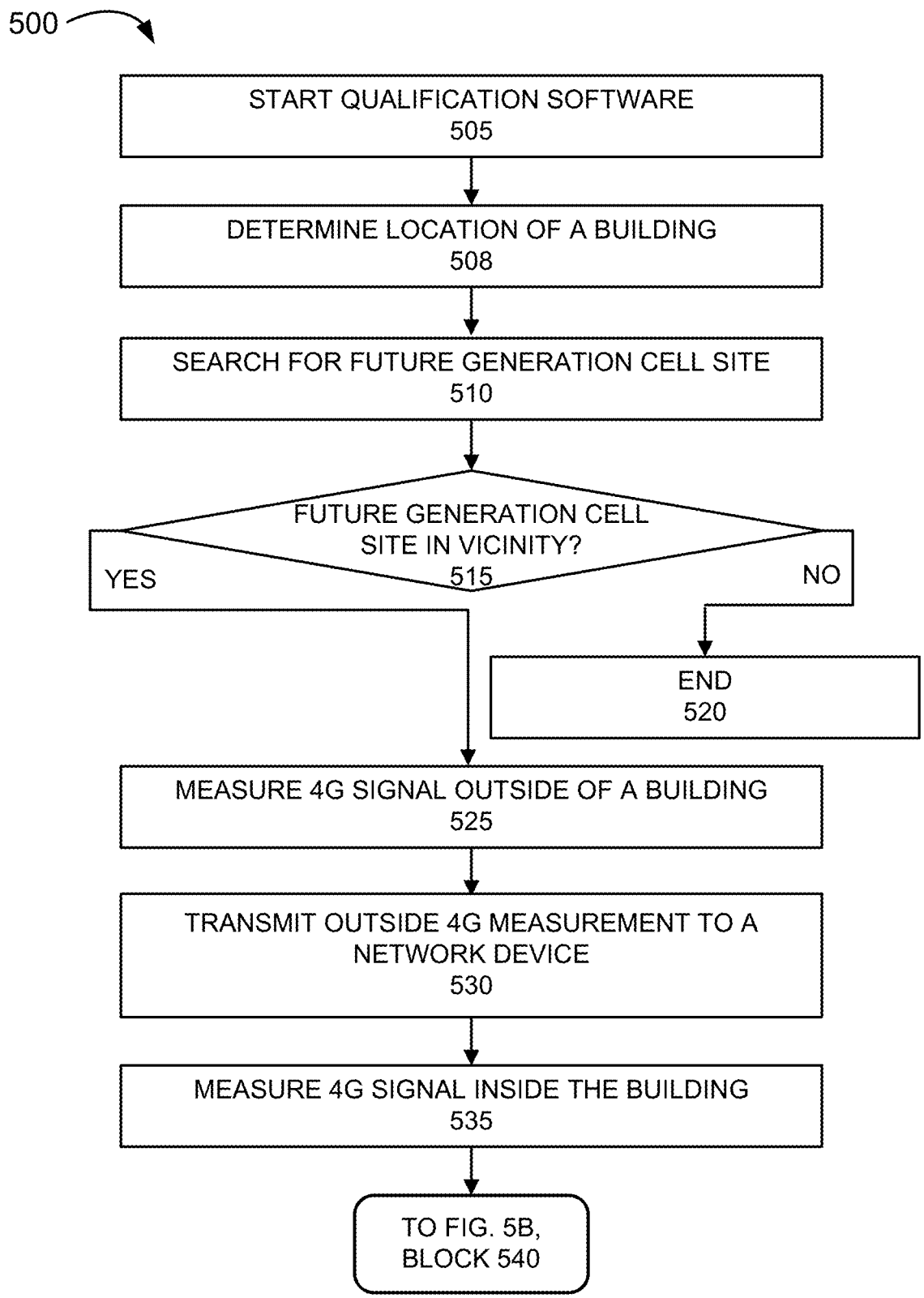
FIGS. 5A-5C are flow diagrams illustrating an exemplary process of an exemplary embodiment of the qualification service.
Figure 5B:
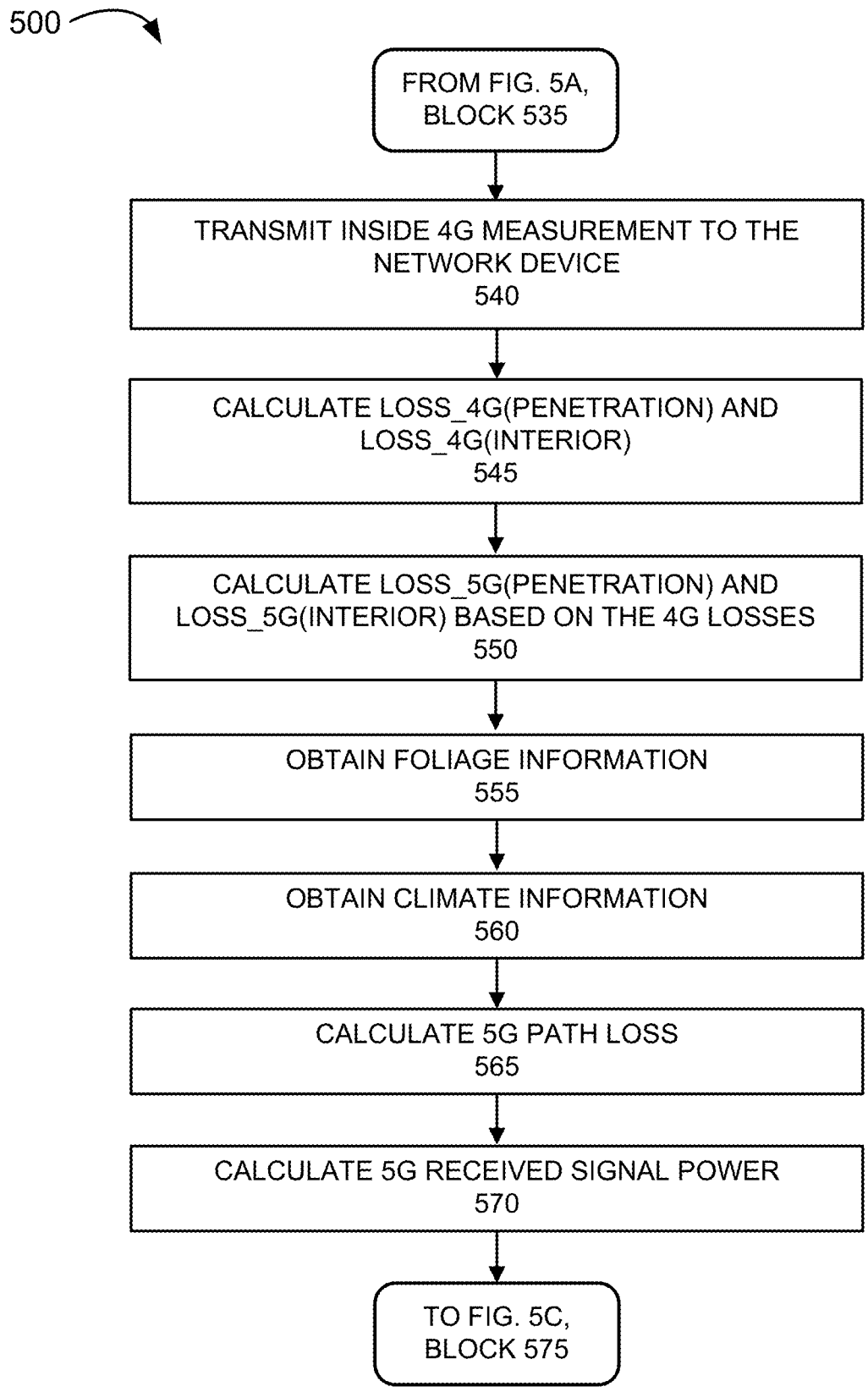
Figure 5C:
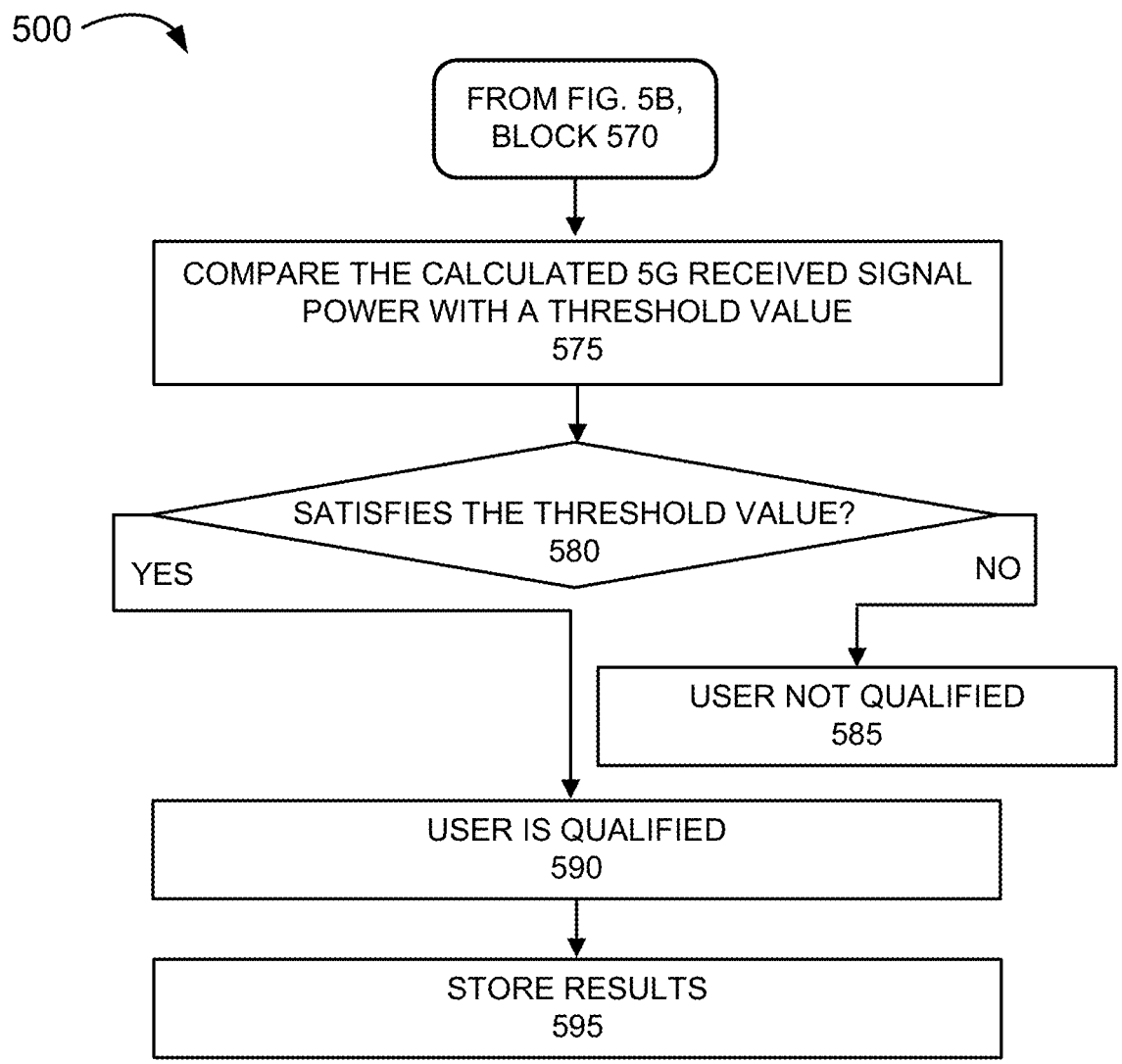

FIGS. 5A-5C are flow diagrams illustrating an exemplary process 500 pertaining to the qualification service. Process 500 is directed to a process previously described above with respect to FIGS. 2A-2G, as well as elsewhere in this description. According to an exemplary embodiment, network device 130 and end device 160 perform steps of process 500. For example, processor 410 executes software 420 to perform the steps illustrated in FIGS. 5A-5C and described herein.

Referring to FIG. 5A, block 505, qualification software is started. For example, user 150 may start the qualification software on his/her end device 160.

In block 508, determine location of a building. For example, the qualification software may prompt user 150 to provide the location of his/her home. According to various exemplary implementations, user 150 may enter an address of user's home 140, the qualification software may obtain the GPS coordinates of user's home 140 via end device 160, or other positioning technologies may be used.

In block 510, a future generation cell site is searched based on the location. For example, the qualification software via end device 160 may transmit the location of user's home 140 to server 130. In response, server 130 may search a database (e.g., table 300) based on the location of user's home 140 to select one or multiple candidate cell sites 120.

In block 515, it is determined whether the future generation cell site is in the vicinity. Server 130 may calculate a distance between the location of user's home 140 and the location of future cell site(s) 120. Server 130 may determine whether the distance satisfies a distance threshold value based on a comparison of the calculated distance with the distance threshold value.

When it is determined that the candidate future generation cell site is not in the vicinity (block 515—NO), then process 500 may end (block 520). For example, when server 130 determines that the distance does not satisfy the distance threshold value, server 130 may transmit a result of the search to user 150 via end device 160. The result may indicate to user 150, via a user interface of the qualification software, that user 150 is not qualified to receive/order a 5G installation kit because there are no future generation cell sites in the vicinity.

When it is determined that the candidate future generation cell site is in the vicinity (block 515—YES), then a 4G signal is measured outside of a building (block 525). For example, when server 130 determines that the distance does satisfy the distance threshold value, server 130 may transmit a result of the search to user 150 via end device 160. The result may indicate to user 150, via a user interface of the qualification software, that a cell site 120 is in the vicinity. Server 130 may calculate a candidate path between cell site 120 and user's home 140 based on the qualification information stored in table 300 and the location of user's home 140. The qualification software may guide user 150 within an area of the calculated path (e.g., path 207) outside of user's home 140. The qualification software may navigate user 150 to location points along path 207 to make 4G signal measurements.

Wireless station 110 may transmit reference signals, as a part of a 4G service, to end device 160. End device 160 may measure a channel condition of a data channel, in which one or multiple values (e.g., RSRP, SINR, etc.) may be measured and/or calculated to include in a channel quality indicator (CQI) report. According to an exemplary implementation, the qualification software may obtain these measured/calculated values that may occur during CQI reporting. According to another exemplary implementation, the qualification service may invoke a measurement in response to user 150 being at a location point within path 207.

In block 530, the 4G signal measurement is transmitted to a network device. For example, the qualification software transmits the 4G signal measurements, via end device 160, to server 130.

In block 535, a 4G signal is measured inside in the building. The qualification software may guide user 150 within an area of the calculated path (e.g., path 207) inside of user's home 140. The qualification software may navigate user 150 to location points within path 207 to make 4G signal measurements. The qualification software/end device 160 may measure channel conditions inside user's home 140 in a manner similar to that previously described.

Referring to FIG. 5B, in block 540, the 4G signal measurement is transmitted to a network device. For example, the qualification software transmits the 4G signal measurements, via end device 160, to server 130.

In block 545, a 4G penetration loss and a 4G interior loss are calculated. For example, server 130 may calculate the 4G penetration loss and the 4G interior loss based on the measurements received. Server 130 may calculate one or multiple 4G penetration loss values and one or multiple 4G interior loss values based on one or multiple corresponding outdoor/indoor measurements.

In block 550, a 5G penetration loss and a 5G interior loss are calculated based on the calculated 4G penetration loss and the 4G interior loss. For example, server 130 may calculate the 5G penetration loss and the 5G interior loss based on scalars that bias the calculated 4G penetration loss and the 4G interior loss to the 5G frequency band of cell site 120. According to an exemplary implementation, server 130 may calculate the 5G penetration loss and the 5G interior loss using expressions (1) and (2).

In block 555, foliage information may be obtained. For example, the qualification software may obtain foliage information from user 150. The qualification software may transmit, via end device 160, to server 130 the foliage information. Server 130 may calculate a 5G foliage loss based on the foliage information. According to an exemplary implementation, server 130 may calculate the 5G foliage loss using expressions (3) or (4).

In block 560, climate information may be obtained. For example, server 130 may obtain climate information pertaining to user's home 140. Server 130 may calculate a 5G rain loss based on the climate information.

In block 565, a 5G path loss is calculated. For example, server 130 may calculate the 5G path loss based on 5G losses previously calculated. According to an exemplary implementation, server 130 may calculate the 5G path loss using expression (5).

In block 570, a 5G received signal power is calculated. For example, server 130 may calculate the 5G received signal power based on the calculated 5G path loss. According to an exemplary implementation, server 130 may calculate the 5G received signal power using expression (6).

Referring to FIG. 5C, in block 575, server 130 may compare the calculated 5G received signal power value with the 5G received signal power threshold value. In block 580, it is determined whether the calculated 5G received signal power satisfies the threshold value. For example, server 130 may determine whether the calculated 5G received signal power value satisfies the 5G received signal power threshold value based on the comparison.

When it is determined that the calculated 5G received signal power does not satisfy the threshold value (block 580—NO), then the user is not qualified (block 585). For example, server 130 determines that user 150 has not qualified. User 150 is not eligible to order the self-installation kit. The qualification software may indicate, via a user interface, to user 150 that he/she is not eligible to order the 5G self-installation kit.

When it is determined that the calculated 5G received signal power does satisfy the threshold value (block 580—YES), then the user is qualified (block 590). For example, server 130 determines that user 150 has qualified. User 150 is eligible to order the 5G self-installation kit. The qualification software may indicate, via a user interface, to user 150 that he/she is eligible to order the 5G self-installation kit. The qualification software may provide instructions/guidance to order the 5G self-installation kit. In block 595, the results are stored. For example, server 130 may store the results in a database (e.g., table 320). Additionally, or alternatively, server 130 may transmit various values to end device 160. For example, the qualification software may receive and store the 5G path loss value and the 5G received signal power value at end device 160. Also, the qualification software may receive and store other values (e.g., 4G loss values, 5G loss values, scalar values, etc.). These values stored locally at end device 160 may be used during the self-installation process, as described herein.

Although FIGS. 5A-5C illustrate an exemplary process 500 of the qualification service, according to other embodiments, process 500 may include additional operations, fewer operations, and/or different operations than those illustrated in FIGS. 5A-5C and described herein. Also, in process 500, server 130 may calculate one or multiple 4G penetration loss values, 4G interior loss values, 5G path loss values, 5G received signal power values, etc., based on one or multiple corresponding 4G outdoor/indoor measurements taken by user 150. Server 130 may select the best indoor location for placing the 5G equipment in user's home 140 during a self-installation process based on the location within path 207 that yielded the highest 5G received signal power value.

Figure 6A:
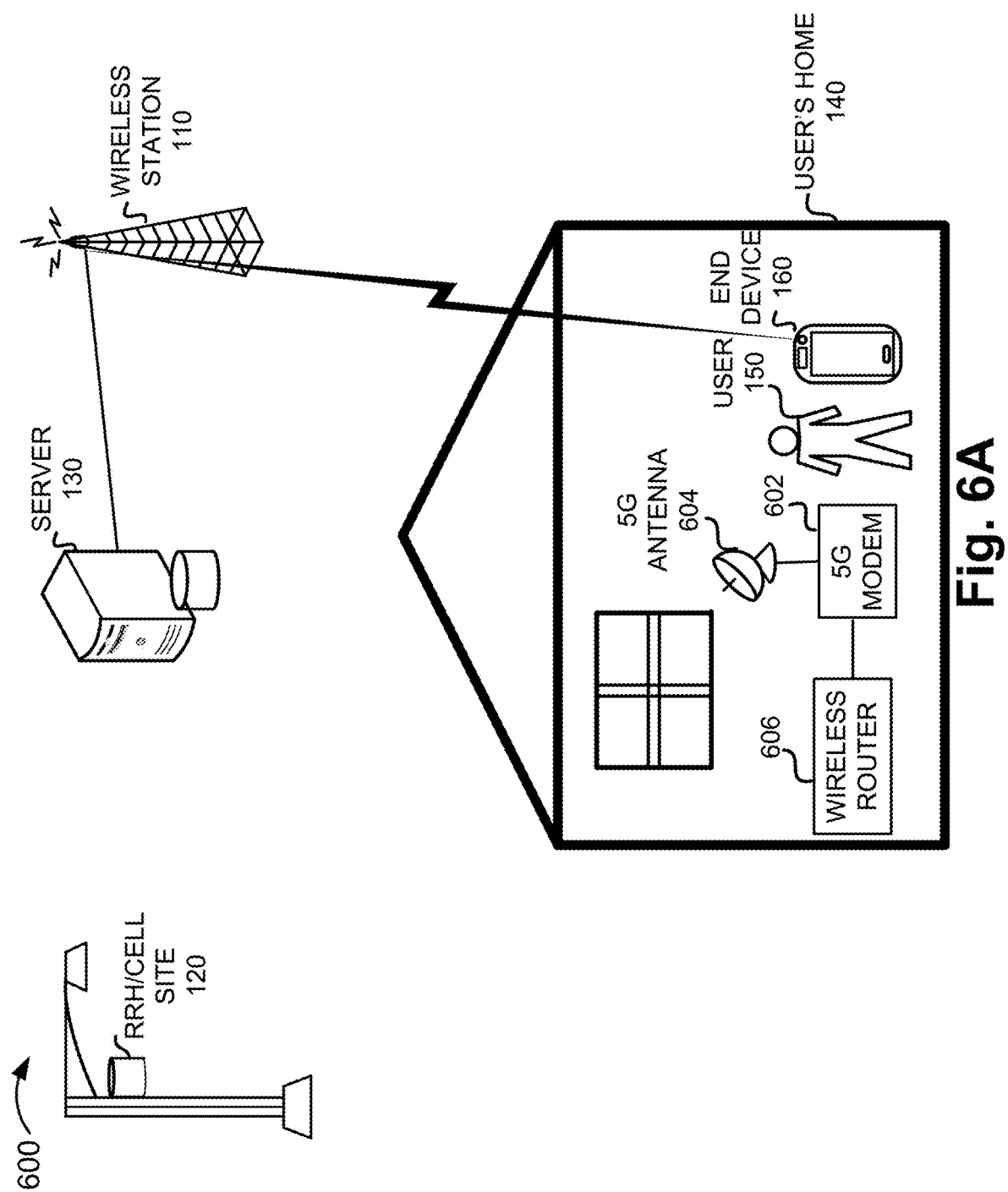

FIGS. 6A-6E are diagrams illustrating an exemplary process of the self-installation service. According to various embodiments, an operation or a step described in the process may be performed by server 130, end device 160, a combination of end device 160 and server 130, or the 5G equipment. Referring to FIG. 6A, assume user 150 has qualified via the qualification service and is eligible to receive the 5G self-installation kit. According to such an exemplary scenario, assume that user 150 orders the 5G self-installation kit from a service provider, and the 5G self-installation kit arrives at user's home 140. The 5G installation kit includes 5G equipment that can communicate with cell site 120 and provide 5G service, as described herein. For the purposes of this example, assume that end device 160 includes a self-installation application. Alternatively, the functionality of the self-installation application described herein may be a part of the qualification application. The self-installation application includes user interfaces that guide user 150 through a self-installation process for installing the 5G equipment.

As illustrated in FIG. 6A, in addition to the elements of environment 100 previously described, an exemplary environment 600 includes a 5G modem 602, a 5G antenna 604, and a wireless router 606.

5G modem 602 includes a device with computational and communication capabilities that provide a 5G service. For example, 5G modem 602 includes logic that modulates and demodulates signals. 5G modem 602 may also include logic that encodes and decodes signals. By way of further example, 5G signals received from cell site 120 via 5G antenna 604 may be demodulated and decoded. Also, for signals received from wireless router 606, 5G modem 602 may modulate and encode these signals for 5G transmission to cell site 120 via 5G antenna 604.

5G antenna 604 includes an antenna that can receive and transmit signals (e.g., 5G signals). For example, 5G antenna 604 may receive and transmit 5G signals within a 5G frequency band used by cell site 120. Although 5G modem 602 and 5G antenna 604 are illustrated as separate devices, according to other exemplary implementations, 5G modem 602 and 5G antenna 604 may be a single, unitary device.

Wireless router 606 includes a device that provides a wireless service. For example, wireless router 606 may be implemented as a router including WiFi wireless technology (e.g., 802.11ac, 802.11b, etc.) or another type wireless technology (e.g., WiMax, etc.). By way of further example, wireless router 606 may operate in the 2.4, 5.0, and/or 60 GHz bands and may support wireless technologies, such as LTE-Wireless Local Area Network (LWA), License-Assisted Access (LAA), etc.

As illustrated, wireless router 606, 5G modem 602, and 5G antenna 604 are communicatively coupled. For example, these devices may be connected via various types of mediums, such as wireless (e.g., radio, microwave, terrestrial, satellite, infrared, etc.) and/or wired (e.g., coaxial cable, Ethernet, optical fiber, copper, etc.).

Referring to FIG. 6A, assume that user 150 plugs in and connects the 5G equipment (e.g., 5G modem 602 and 5G antenna 605) with wireless router 606. According to an exemplary implementation, during the set-up process, the self-installation application may guide user 150 to a location (e.g., a latitude and longitude coordinate) inside user's home 140 where 5G antenna 604 is to be placed that yields the highest received signal power value. For example, the self-installation application may obtain this information from server 130 or from values stored at end device 160. User 150 may set up the 5G equipment at the specified location. For example, user 150 may orient 5G antenna 604 to face towards cell site 120. The 5G equipment may also indicate (e.g., a light indicator, etc.) to user 150 when a highest 5G received signal power is being received.

Figure 6B:
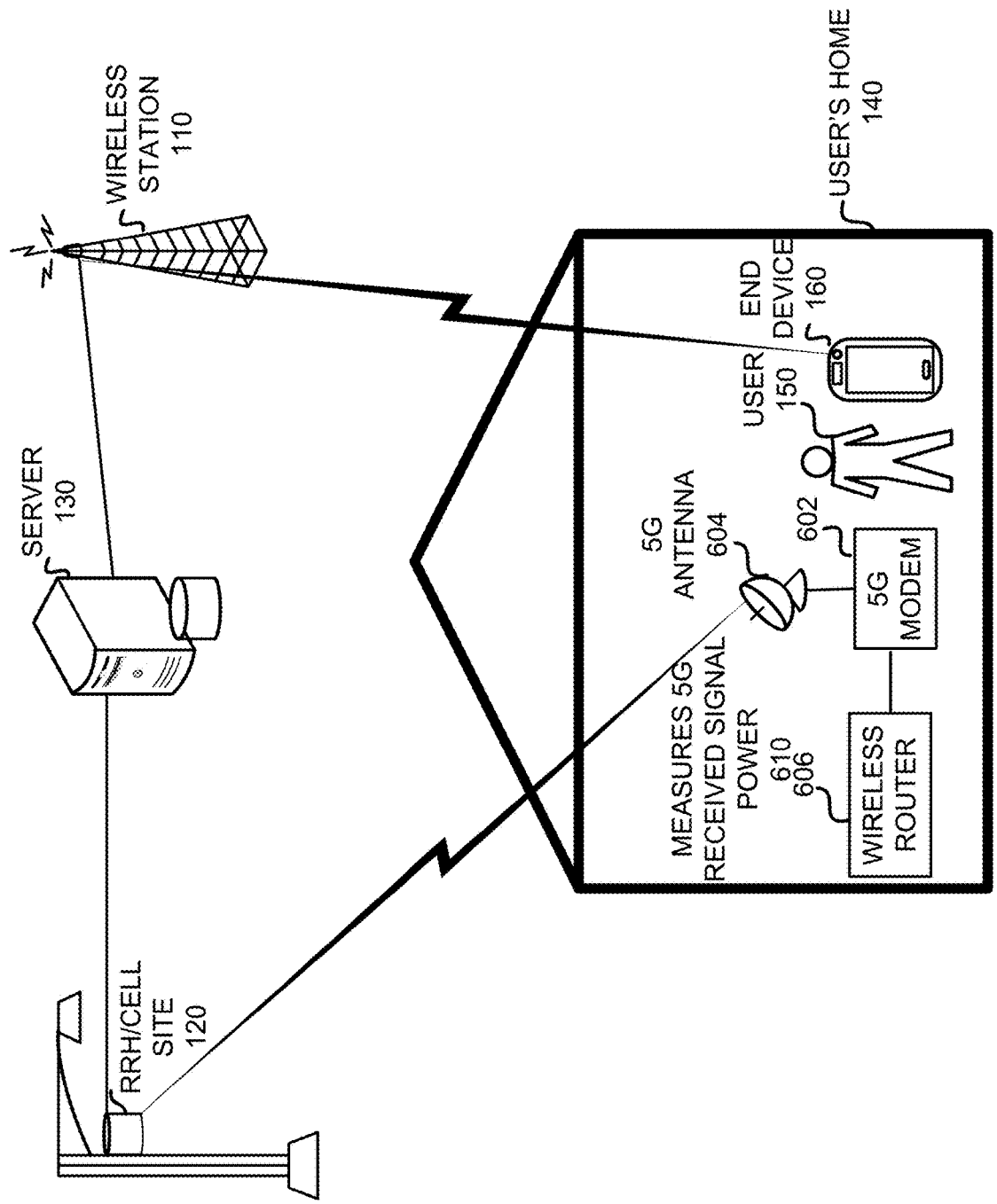
Figure 6C:
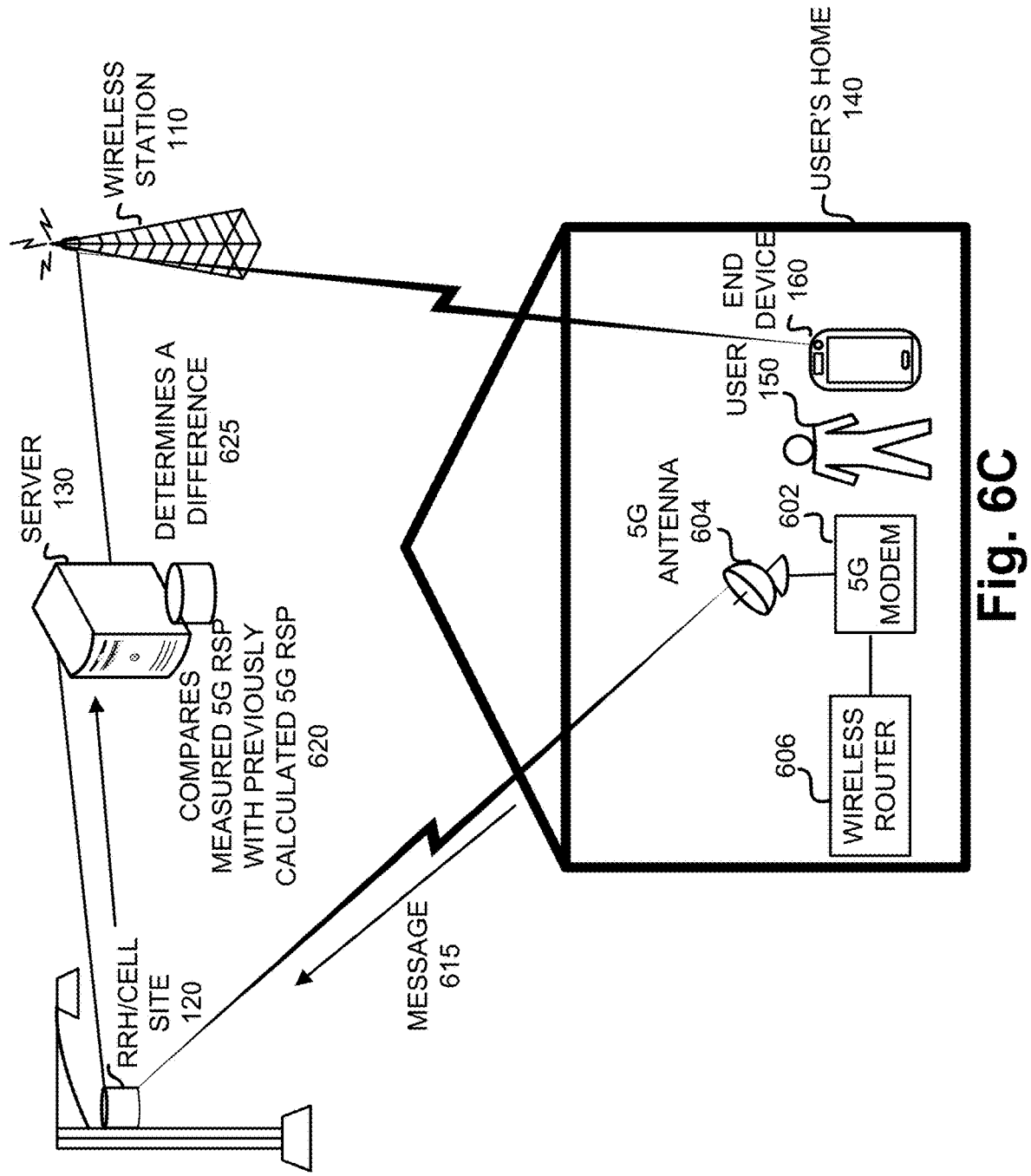
Figure 6E:
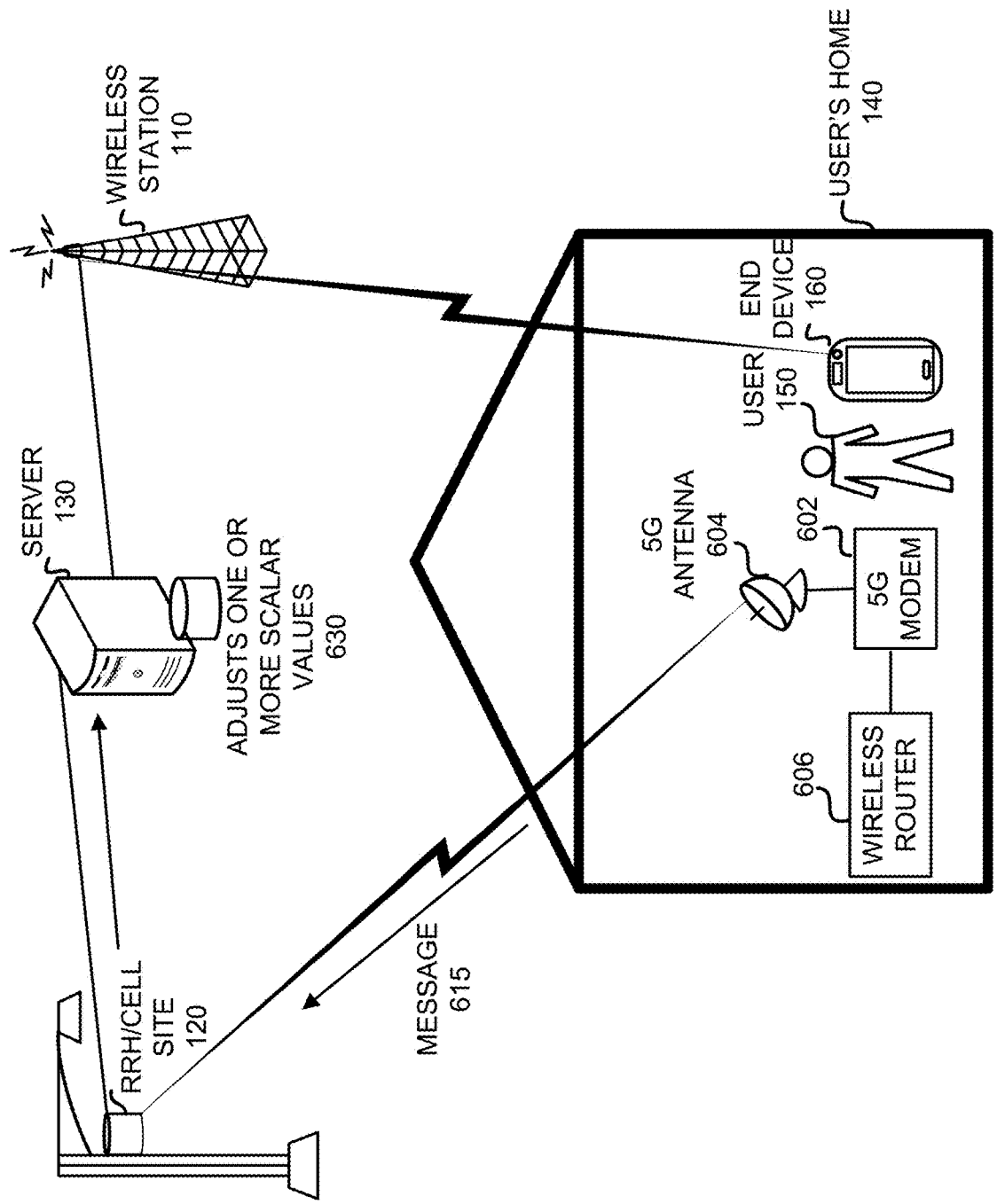

Subsequent to the initial setup, referring to FIG. 6B, the 5G equipment measures the 5G received signal power 610 associated with a communication link with cell site 120. According to an exemplary implementation, the 5G equipment may transmit a message 615, which includes the measured 5G received signal power value, to server 130 via cell site 120. In response to receiving the message 615, server 130 may compare the 5G received signal power with the previously calculated 5G received signal power 620 obtained during the qualification process. Based on the comparison, it is determined whether a difference 625, if any, is within a pre-configured delta value (e.g., ±X dBm). When the measured 5G received signal power is within the delta value, one or more of the scalar values (e.g., $n_{LTE\_BIAS}$, $\alpha$, $\beta$) used to calculate the $PL_{5G}$, which in turn is used to calculate the $RXPower_{5G}$, may be adjusted 630. For example, server 130 may use the calculated difference value (e.g., between the measured 5G received signal power and the previously calculated 5G received signal power) and the measured 5G received signal power value as arguments for a machine learning algorithm to adjust the value of $n_{LTE\_BIAS}$.

Given this framework, as users install 5G equipments within buildings 140, the value of $n_{LTE\_BIAS}$ may be adjusted to more accurately reflect the 4G-to-5G biasing. When the measured 5G received signal power is not within the delta value, the self-installation application may prompt user 150 to have the 5G equipment retake the 5G received signal power measurement, may prompt user 150 to adjust the direction at which 5G antenna 604 points toward cell site 120, and/or request that user 150 perform some other troubleshooting measure. Alternatively, user 150 may be directed to contact customer support.

Although FIGS. 6A-6E illustrate an exemplary process 600 of the self installation service, according to other embodiments, process 600 may include additional operations, fewer operations, and/or different operations than those illustrated in FIGS. 6A-6E and described herein. For example, the 5G equipment or end device 160 may compare the measured 5G received signal power with the previously calculated 5G received signal power. When the difference value is within the delta value, the 5G equipment or end device 160 may transmit the difference value to server 130. Server 130 may adjust the scalar value, as previously described.

Figure 7:
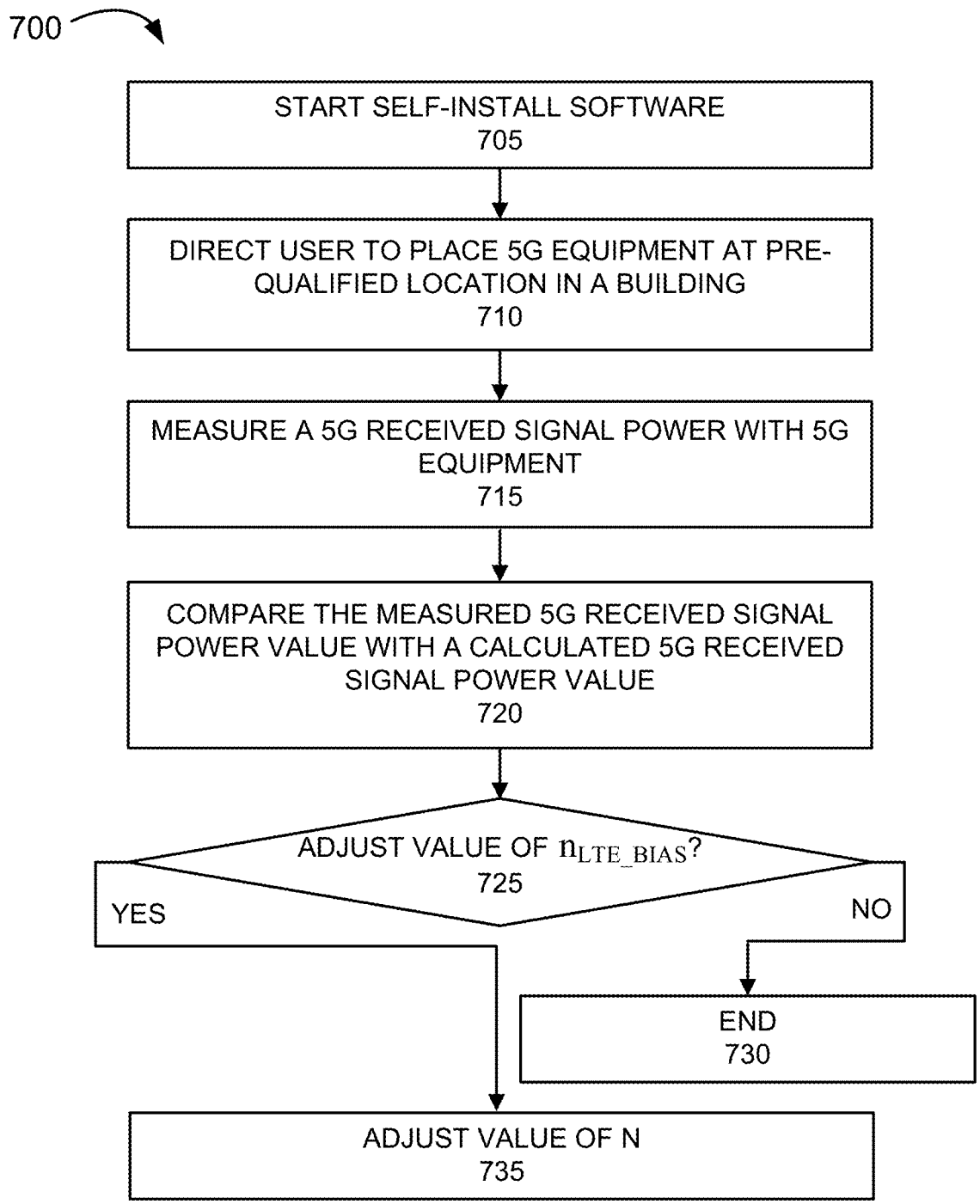
FIG. 7 is a flow diagram illustrating an exemplary process of the self-installation service.

FIG. 7 is a flow diagram illustrating an exemplary process 700 pertaining to the self-installation service. Process 700 is directed to a process previously described above with respect to FIGS. 6A-6E, as well as elsewhere in this description. According to an exemplary embodiment, end device 160, the 5G equipment (e.g., 5G modem 602 and 5G antenna 604), and server 130 may perform steps of process 700. For example, processor 410 executes software 420 to perform the steps illustrated in FIG. 7 and described herein.

In block 705, self-installation software is started. For example, user 150 may start the qualification software on his/her end device 160.

In block 710, the user is directed to a location in the building to place the 5G equipment. For example, the self-installation software may direct user 150, via end device 160, to a location that yielded the highest 5G received signal power previously calculated by server 130 during the qualification process. User 150 may set up the 5G equipment at the specified location. For example, user 150 may orient 5G antenna 604 to face towards cell site 120. The 5G equipment may also indicate to user 150 (e.g., a light indicator, etc.) that a highest 5G received signal power is being received.

In block, 715, a 5G received signal power is measured by the 5G equipment. For example, the 5G equipment may measure the 5G received signal power associated with cell site 120.

In block 720, the measured 5G received signal power value is compared with a calculated 5G received signal power value. For example, the 5G equipment may transmit the measured 5G received signal power to server 130 or end device 160. Server 130 may compare the measured 5G received signal power value with the 5G received signal power value previously calculated and stored (e.g., in table 320) during the qualification process. Server 130 may determine whether a difference, if any, is within a delta value.

In block 725, it is determined whether the value of $n_{LTE\_BIAS}$ is to be adjusted. For example, when the measured 5G received signal power is not within the delta value (block 725—NO), server 130 may determine to not adjust the value of $n_{LTE\_BIAS}$ (block 730). The self-installation application may prompt user 150 to have the 5G equipment retake the 5G received signal power measurement, may prompt user 150 to adjust the direction at which 5G antenna 604 points, and/or perform some other troubleshooting measure. Alternatively, user 150 may be directed to contact customer support.

When the measured 5G received signal power is within the delta value (block 725—YES), server 130 may adjust the value of $n_{LTE\_BIAS}$ (block 735). For example, server 130 may use the calculated difference value (i.e., between the measured 5G received signal power value and the previously calculated 5G received signal power value) and the measured 5G received signal power value as arguments for a machine learning algorithm to adjust the value of $n_{LTE\_BIAS}$. The $n_{LTE\_BIAS}$ variable may be considered a path loss exponent that has a value based on various parameters, such as frequency, environment, terrain, obstructions, and other factors. As an example, an initial value of 4 for $n_{LTE\_BIAS}$ may be considered (e.g., based on an averaging of lab measurements), which takes into account the lossy environment. According to such an example, the value of 4 may be applied to all users and considered a global value for $n_{LTE\_BIAS}$. However, as 5G received signal powers are obtained from different users and locations, server 130 may recalculate the global value of $n_{LTE\_BIAS}$ to different local values based on the geographic region and/or other factors pertaining to the value of $n_{LTE\_BIAS}$.

Although FIG. 7 illustrates an exemplary process 700 of the self-installation service, according to other embodiments, process 700 may include additional operations, fewer operations, and/or different operations than those illustrated in FIG. 7 and described herein. For example, process 700 may also adjust other values, as previously described.

The foregoing description of embodiments provides illustration, but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive. For example, although reference is made to LTE, LTE-A, 4G, and 4.5G in relation to wireless station 110, according to other exemplary implementations, wireless station 110 may be a part of another type of access network (e.g., radio access network (RAN)), such as a legacy access network (e.g., a Third Generation (3G) RAN, a 3.5G RAN). By way of further example, the access network may include a U-TRAN, a Universal Mobile Telecommunications System (UMTS) RAN, a Global System for Mobile Communications (GSM) RAN, a Code Division Multiple Access (CDMA) RAN, a Wideband CDMA (WCDMA) RAN, an Ultra Mobile Broadband (UMB) RAN, a High-Speed Packet Access (HSPA) RAN, or an Evolution Data Optimized (EV-DO) RAN. In this way, the qualification service and the self-installation service described herein may be implemented to calculate biased values (e.g., path loss, received signal power, etc.) based on other current or legacy wireless technologies and/or a frequency bands measured.

In addition, while series of blocks have been described with regard to the processes illustrated in FIGS. 5A-5C, and 7, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 410, etc.), or a combination of hardware and software (e.g., software 420). The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 410) of a computational device. A non-transitory storage medium includes one or more of the storage mediums described in relation to memory/storage 415.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   receiving, by a network device and from an end device, a first measurement of a first signal transmitted at a first frequency by a wireless station and measured outside of a building;
   receiving, by the network device and from the end device, a second measurement of a second signal transmitted at the first frequency by the wireless station and measured inside the building;
   calculating, by the network device, based on the first measurement and the second measurement, a penetration loss, and an interior loss based on the first measurement, for a second frequency, between a future generation cell site and the building, wherein the first frequency differs from the second frequency;
   calculating, by the network device, based on the penetration loss and the interior loss, a path loss, for the second frequency;
   calculating, by the network device, a received signal power, for the second frequency, of the future generation cell site based on the path loss;
   comparing, by the network device, the received signal power to a threshold value; and
   determining, by the network device and based on the comparing, whether the building qualifies to receive future generation equipment to be located in the building based on the comparing.

2. The method of claim 1, further comprising:
   determining, by the network device, that the building qualifies to receive the future generation equipment, in response to determining that the received signal power satisfies the threshold value.

3. The method of claim 1, further comprising:
   determining a location of the building;
   searching locations of future generation cell sites; and
   determining whether one of the locations of one of the future generation cell sites is in a vicinity of the building based on the location of the building and the locations of the future generation cell sites.

4. The method of claim 3, further comprising:
   calculating, by the network device, a path between the location of the building and the one of the locations of the one of the future generation cell sites; and
   navigating, by the network device, the end device to a location along the path to take the first measurement and the second measurement.

5. The method of claim 1, wherein the first frequency is in a Megahertz band of a first radio access technology and the second frequency is in a Gigahertz band of a second radio access technology that is different from the first radio access technology.

6. The method of claim 1, wherein calculating the penetration loss further comprising:
   calculating, by the network device, a first penetration loss based on the first measurement and the second measurement; and
   calculating, by the network device, the penetration loss pertaining to the future generation cell site based on the first penetration loss and a scalar value.

7. The method of claim 1, wherein calculating the interior loss further comprising:
   calculating, by the network device, a first interior loss at the first frequency; and
   calculating, by the network device, the interior loss at the second frequency pertaining to the future generation cell site based on the first interior loss at the first frequency and a scalar value.

8. The method of claim 1, wherein the first measurement and the second measurement each comprises a reference signal received power value, and the method further comprising:
   transmitting, by the network device to the end device, data indicating that the building qualifies to receive the future generation equipment, in response to determining that the building qualifies.

9. A network device comprising:
   a communication interface;
   a memory, wherein the memory stores instructions; and
   a processor, wherein the processor executes the instructions to:
   receive, via the communication interface and from an end device, a first measurement of a first signal transmitted at a first frequency by a wireless station and measured outside of a building;
   receive, via the communication interface and from the end device, a second measurement of a second signal transmitted at the first frequency by the wireless station and measured inside the building;
   calculate based on the first measurement and the second measurement, a penetration loss, and an interior loss based on the first measurement, for a second frequency, between a future generation cell site and the building, wherein the first frequency differs from the second frequency;
   calculate, based on the based on the penetration loss and the interior loss, a path loss, for the second frequency;
   calculate a received signal power, for the second frequency of the future generation cell site based on the path loss;
   compare the received signal power to a threshold value; and
   determine, based on the comparison, whether the building is qualified to receive future generation equipment to be located in the building.

10. The network device of claim 9, wherein the processor further executes the instructions to:
    determine that the building qualifies to receive the future generation equipment, in response to a determination that the received signal power satisfies the threshold value.

11. The network device of claim 9, wherein the processor further executes the instructions to:
    determine a location of the building;
    search locations of future generation cell sites; and
    determine whether one of the locations of one of the future generation cell sites is in a vicinity of the building based on the location of the building and the locations of the future generation cell sites.

12. The network device of claim 11, wherein the processor further executes the instructions to:
    calculate a path between the location of the building and the one of the locations of the one of the future generation cell sites; and
    navigate the end device to a location along the path to take the first measurement and the second measurement.

13. The network device of claim 9, wherein the first frequency is in a Megahertz band of a first radio access technology and the second frequency is in a Gigahertz band of a second radio access technology that is different from the first radio access technology.

14. The network device of claim 9, wherein, when calculating the penetration loss, the processor further executes the instructions to:
  calculate a first penetration loss based on the first measurement and the second measurement; and
  calculate the penetration loss pertaining to the future generation cell site based on the first penetration loss and a scalar value.

15. The network device of claim 9, wherein, when calculating the interior loss, the processor further executes the instructions to:
  calculate a first interior loss at the first frequency; and
  calculate the interior loss at the second frequency pertaining to the future generation cell site based on the first interior loss of the first frequency and a scalar value.

16. A non-transitory computer-readable storage medium storing instructions executable by a processor of a device, which when executed, cause the device to:
  receive, from an end device, a first measurement of a first signal transmitted at a first frequency by a wireless station and measured outside of a building;
  receive, from the end device, a second measurement of a second signal transmitted at the first frequency by the wireless station and measured inside the building;
  calculate based on the first measurement and the second measurement, a penetration loss, and an interior loss based on the first measurement, for a second frequency, between a future generation cell site and the building, wherein the first frequency differs from the second frequency;
  calculate, based on the penetration loss and the interior loss, a path loss, for the second frequency;
  calculate a received signal power, for the second frequency, of the future generation cell site based on the path loss;
  compare the received signal power to a threshold value; and
  determine, based on the comparison, whether the building is qualified to receive future generation equipment to be located in the building.

17. The non-transitory computer-readable storage medium of claim 16, further storing instructions executable by the processor of the device, which when executed, cause the device to:
  determine that the building qualifies to receive the future generation equipment, in response to a determination that the received signal power satisfies the threshold value.

18. The non-transitory computer-readable storage medium of claim 16, wherein the first frequency is in a Megahertz band of a first radio access technology and the second frequency is in a Gigahertz band of a second radio access technology that is different from the first radio access technology.

19. The non-transitory computer-readable storage medium of claim 16, further storing instructions executable by the processor of the device, which when executed, cause the device to:
  calculate a first penetration loss based on the first measurement and the second measurement; and
  calculate the penetration loss pertaining to the future generation cell site based on the first penetration loss and a scalar value.

20. The non-transitory computer-readable storage medium of claim 16, further storing instructions executable by the processor of the device, which when executed, cause the device to:
  calculate a first interior loss at the first frequency; and
  calculate the interior loss at the second frequency pertaining to the future generation cell site based on the first interior loss of the first frequency and a scalar value.

* * * * *